(12) United States Patent
Yang et al.

(10) Patent No.: US 11,736,235 B2
(45) Date of Patent: Aug. 22, 2023

(54) DATA PROCESSING METHOD AND RELATED APPARATUS

(71) Applicant: Huawei Technologies Co., Ltd., Shenzhen (CN)

(72) Inventors: Weiqiang Yang, Shenzhen (CN); Yuejun Wei, Shanghai (CN); Nijun Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/721,085

(22) Filed: Apr. 14, 2022

(65) Prior Publication Data
US 2022/0239414 A1 Jul. 28, 2022

Related U.S. Application Data

(63) Continuation of application No. PCT/CN2020/120606, filed on Oct. 13, 2020.

(30) Foreign Application Priority Data

Oct. 14, 2019 (CN) .......................... 201910980635.5

(51) Int. Cl.
*H04L 1/1809* (2023.01)
*H04L 1/00* (2006.01)
*H04L 1/1607* (2023.01)

(52) U.S. Cl.
CPC .......... *H04L 1/1809* (2013.01); *H04L 1/0041* (2013.01); *H04L 1/1607* (2013.01)

(58) Field of Classification Search
CPC ... H04L 1/0041; H04L 1/0045; H04L 1/0014; H04L 1/1607; H04L 1/1809; G10L 19/005
See application file for complete search history.

(56) References Cited

U.S. PATENT DOCUMENTS 7,002,913 B2 * 2/2006 Huang ................. G10L 19/005
370/254
7,991,612 B2 8/2011 Chen et al.
(Continued)

FOREIGN PATENT DOCUMENTS

CN 1445941 A 10/2003
CN 1731718 A 2/2006
(Continued)

OTHER PUBLICATIONS

Lahouti et al., "Soft Reconstruction of Speech in the Presence of Noise and Packet Loss," IEE Transactions on Audio, Speech, and Language Processing, vol. 15, No. 1, Total pp. 13, Institute of Electrical and Electronics Engineers, New York, New York (Jan. 1, 2007).
(Continued)

*Primary Examiner* — Shelly A Chase
(74) *Attorney, Agent, or Firm* — Leydig, Voit & Mayer, Ltd.

(57) ABSTRACT

A data processing method and a related apparatus are disclosed, to improve data recovery effects in various packet loss scenarios. The method includes: determining a packet loss scenario type corresponding to a first data packet when detecting that the first data packet is lost in a data packet transmission process (201); generating a second data packet based on a data packet adjacent to the first data packet if the packet loss scenario type corresponding to the first data packet meets a data packet compensation condition (202); and finally adding the second data packet to a corresponding target location at which the first data packet is located before the first data packet is lost, that is, using the second data packet to compensate for the lost first data packet (203).

15 Claims, 10 Drawing Sheets

(56) References Cited

U.S. PATENT DOCUMENTS

| | | | |
|---|---|---|---|
| 2005/0044471 A1* | 2/2005 | Chia | H04L 47/2416 714/776 |
| 2005/0049853 A1 | 3/2005 | Lee et al. | |
| 2005/0166124 A1 | 7/2005 | Tsuchinaga et al. | |
| 2019/0198027 A1 | 6/2019 | Liang | |

FOREIGN PATENT DOCUMENTS

| | | | |
|---|---|---|---|
| CN | 1984203 A | 6/2007 | |
| CN | 101483497 A | 7/2009 | |
| CN | 106788876 A | 5/2017 | |
| JP | 2003316391 A | 11/2003 | |
| WO | WO-2017084545 A1 * | 5/2017 | G10L 19/005 |

OTHER PUBLICATIONS

"3rd Generation Partnership Project; Technical Specification Group Services and System Aspects; Mandatory Speech Codec speech processing functions; Adaptive Multi-Rate (AMR) speech codec; Transcoding functions (Release 15)," 3GPP TS 26.090 V15.0.0, total 56 pages, 3rd Generation Partnership Project, Valbonne, France (Jun. 2018).

"3rd Generation Partnership Project; Technical Specification Group Services and System Aspects; Mandatory Speech Codec speech processing functions; Adaptive Multi-Rate (AMR) speech codec; Error concealment of lost frames (Release 15)," 3GPP TS 26.091 V15.0.0, total 13 pages, 3rd Generation Partnership Project, Valbonne, France (Jun. 2018).

"3rd Generation Partnership Project; Technical Specification Group Services and System Aspects; Speech codec speech processing functions; Adaptive Multi-Rate—Wideband (AMR-WB) speech codec; Transcoding functions (Release 15)," 3GPP TS 26.190 V15.0.0, total 51 pages, 3rd Generation Partnership Project, Valbonne, France (Jun. 2018).

"3rd Generation Partnership Project; Technical Specification Group Services and System Aspects; Speech codec speech processing functions; Adaptive Multi-Rate—Wideband (AMR-WB) speech codec; Error concealment of erroneous or lost frames (Release 15)," 3GPP TS 26.191 V15.0.0, total 14 pages, 3rd Generation Partnership Project, Valbonne, France (Jun. 2018).

* cited by examiner

DATA PROCESSING METHOD AND RELATED APPARATUS

CROSS-REFERENCE TO RELATED APPLICATIONS

This application is a continuation of International Application No. PCT/CN2020/120606, filed on Oct. 13, 2020, which claims priority to Chinese Patent Application No. 201910980635.5, filed on Oct. 14, 2019. The disclosures of the aforementioned applications are hereby incorporated by reference in their entireties.

TECHNICAL FIELD

This application relates to the field of communication technologies, and in particular, to a data processing method and a related apparatus.

BACKGROUND

In a communication system, to implement voice transmission between two devices, a sending device usually needs to code voice to obtain a voice packet, and transmit the voice packet to a receiving device via a network element device in the communication system. Finally, the receiving device decodes the voice packet to obtain the voice.

During the voice packet transmission, the voice packet may be lost due to a problem such as network congestion. Currently, when the voice packet is lost, a waveform of the lost voice packet usually needs to be compensated for by using a waveform compensation method in a process in which the receiving device decodes the voice packet, to ensure continuity of a voice waveform. A current waveform compensation method, for example, a packet loss concealment (PLC) method, is mainly to reconstruct the waveform of the lost voice packet based on a plurality of voice packets located before the lost voice packet.

However, in some packet loss scenarios, for example, when the waveform corresponding to the lost voice packet is greatly different from waveforms of the plurality of voice packets located before the lost voice packet, a waveform for compensation by using the PLC method is obviously distorted. Consequently, voice quality deteriorates, and a voice recovery effect is relatively poor. Therefore, the currently used waveform compensation method has poor robustness, and is difficult to adapt to various packet loss scenarios.

SUMMARY

Embodiments of this application provide a data processing method and a related apparatus. A packet loss scenario type is determined, and when the packet loss scenario type meets a data packet compensation condition, a compensation data packet is generated to compensate for a lost data packet. When the data packet compensation condition is met, data recovered by directly using the compensation data packet is closer to lost data. Therefore, compared with a PLC method, this method can achieve better data recovery effects with lower complexity, and improve adaptability in various packet loss scenarios.

In view of this, a first aspect of this application provides a data processing method. The method includes: determining a packet loss scenario type corresponding to a first data packet when detecting that the first data packet is lost in a data packet transmission process; generating a second data packet based on a data packet adjacent to the first data packet if the packet loss scenario type corresponding to the first data packet meets a data packet compensation condition; and finally adding the second data packet to a corresponding target location at which the first data packet is located before the first data packet is lost, that is, directly using the second data packet to compensate for the lost first data packet.

In this embodiment of this application, a packet loss scenario type corresponding to a lost data packet is determined, and when the packet loss scenario type meets the data packet compensation condition, a compensation data packet is generated to compensate for the lost data packet. When the data packet compensation condition is met, data recovered by directly using the compensation data packet is closer to lost data. Therefore, compared with a PLC method, this method can achieve better data recovery effects with lower complexity, and improve adaptability in various packet loss scenarios.

Optionally, in some possible implementations, the packet loss scenario type may include a first packet loss scenario, the data packet compensation condition may include a first compensation condition, and the first packet loss scenario meets the first compensation condition; and the generating a second data packet based on a data packet adjacent to the first data packet if the packet loss scenario type corresponding to the first data packet meets a data packet compensation condition includes: if the packet loss scenario type corresponding to the first data packet meets the first compensation condition, that is, the packet loss scenario type corresponding to the first data packet is the first packet loss scenario, generating the second data packet based on an adjacent data packet previous to the first data packet.

In this embodiment of this application, based on the packet loss scenario type corresponding to the lost data packet, an adjacent data packet previous to the lost data packet is determined to be used to compensate for the lost data packet. When the data packet previous to the lost data packet is closer to the lost data packet, compared with the PLC method, this method can achieve better data recovery effects with lower complexity, and improve adaptability in various packet loss scenarios.

Optionally, in some possible implementations, the packet loss scenario type may include a second packet loss scenario, the data packet compensation condition may include a second compensation condition, and the second packet loss scenario meets the second compensation condition; and the generating a second data packet based on a data packet adjacent to the first data packet if the packet loss scenario type corresponding to the first data packet meets a data packet compensation condition includes: if the packet loss scenario type corresponding to the first data packet meets the second compensation condition, that is, the packet loss scenario type corresponding to the first data packet is the second packet loss scenario, generating the second data packet based on an adjacent data packet following the first data packet.

In this embodiment of this application, based on the packet loss scenario type corresponding to the lost data packet, an adjacent data packet following the lost data packet is determined to be used to compensate for the lost data packet. When the data packet following the lost data packet is closer to the lost data packet, compared with the PLC method, this method can achieve better data recovery effects with lower complexity, and improve adaptability in various packet loss scenarios.

Optionally, in some possible implementations, the packet loss scenario type includes a third packet loss scenario, and the third packet loss scenario does not meet the data packet compensation condition; and the method further includes: if the packet loss scenario type does not meet the data packet compensation condition, that is, the packet loss scenario type is the third packet loss scenario, reconstructing a waveform of the first data packet by using the PLC method, to recover the first data packet.

In this embodiment of this application, when it is determined that the packet loss scenario type corresponding to the lost data packet is a scenario in which the data packet compensation condition is not met, that is, an effect of compensating for the lost data packet by using the data packet adjacent to the lost data packet is worse than an effect of recovering the lost data packet by using the PLC method, the PLC method is used to recover the lost data packet, thereby ensuring recovery effects of the lost data packet.

Optionally, in some possible implementations, the determining a packet loss scenario type corresponding to a first data packet when detecting that the first data packet is lost includes: when detecting that the first data packet is lost, determining, based on an associated data packet corresponding to the first data packet, the packet loss scenario type corresponding to the first data packet, where the associated data packet may be M adjacent data packets previous to the first data packet, the associated data packet may be N adjacent data packets following the first data packet, or the associated data packet may be M adjacent data packets previous to the first data packet and N adjacent data packets following the first data packet, where M is an integer greater than or equal to 1, and N is an integer greater than or equal to 1.

In this embodiment of this application, the packet loss scenario type is identified by using an associated data packet corresponding to the lost data packet. This can improve an identification rate of the packet loss scenario type, thereby ensuring recovery effects of the lost data packet in a subsequent process.

Optionally, in some possible implementations, the method further includes: obtaining the associated data packet corresponding to the first data packet; obtaining a coding parameter of the associated data packet; and the determining the packet loss scenario type based on the associated data packet includes: inputting the coding parameter of the associated data packet into a pre-trained packet loss scenario determining model; and determining, based on an output result of the packet loss scenario determining model, the packet loss scenario type corresponding to the first data packet.

In this embodiment of this application, the packet loss scenario type is identified based on the pre-trained packet loss scenario determining model and the coding parameter of the associated data packet. This can improve an identification rate and an identification speed of the packet loss scenario type, thereby ensuring the recovery effect of the lost data packet in the subsequent process.

Optionally, in some possible implementations, the first data packet and the corresponding associated data packet may be voice data packets. Before the coding parameter of the associated data packet is input into the packet loss scenario determining model, the method further includes: first obtaining a sample voice packet segment, where the sample voice packet segment includes a plurality of first voice packets, and at least one second voice packet in the sample voice packet segment has been removed, that is, the sample voice packet segment is a voice packet segment in which the second voice packet is lost; then generating a to-be-trained sample based on the sample voice packet segment, where the to-be-trained sample includes the sample voice packet segment and a packet loss scenario label corresponding to the sample voice packet segment; and finally training a classification model by using the to-be-trained sample, to obtain the packet loss scenario determining model, namely, a trained classification model.

In this embodiment of this application, the classification model is trained by using the sample voice packet segment in which the voice packet is lost, to obtain the packet loss scenario determining model. A large quantity of samples are used to train the model, so that an identification rate of the packet loss scenario by the obtained packet loss scenario determining model can be improved, thereby ensuring the recovery effect of the lost data packet in the subsequent process.

Optionally, in some possible implementations, the generating a to-be-trained sample based on the sample voice packet segment may specifically include: performing packet compensation on the second voice packet by using an adjacent first voice packet previous to the second voice packet, to obtain a first recovered voice; performing packet compensation on the second voice packet by using an adjacent first voice packet following the second voice packet, to obtain a second recovered voice; performing voice recovery on the sample voice packet segment by using the PLC method, to obtain a third recovered voice; obtaining a first voice quality evaluation value corresponding to the first recovered voice, a second voice quality evaluation value corresponding to the second recovered voice, and a third voice quality evaluation value corresponding to the third recovered voice; and determining, based on the first voice quality evaluation value, the second voice quality evaluation value, and the third voice quality evaluation value, the packet loss scenario label corresponding to the sample voice packet segment.

In this embodiment of this application, different voice packet compensation methods are used to compensate for the lost voice packet, and the packet loss scenario label of the sample voice packet segment is determined based on the voice quality corresponding to the recovered voices obtained by using different voice packet compensation methods, so that accuracy of the packet loss scenario label corresponding to the sample voice packet segment can be effectively improved, thereby improving an identification rate of the packet loss scenario by the obtained packet loss scenario determining model.

Optionally, in some possible implementations, the determining, based on the first voice quality evaluation value, the second voice quality evaluation value, and the third voice quality evaluation value, the packet loss scenario label corresponding to the sample voice packet segment may include: if the first voice quality evaluation value is greater than the second voice quality evaluation value and the third voice quality evaluation value, marking the packet loss scenario of the sample voice packet segment as the first packet loss scenario; if the second voice quality evaluation value is greater than the first voice quality evaluation value and the third voice quality evaluation value, marking the packet loss scenario of the sample voice packet segment as the second packet loss scenario; or if the third voice quality evaluation value is greater than the first voice quality evaluation value and the second voice quality evaluation value, marking the packet loss scenario of the sample voice packet segment as the first packet loss scenario.

In this embodiment of this application, after voice recovery is performed on the sample voice packet segment by using different voice recovery methods, the packet loss scenario label of the sample voice packet segment is determined by comparing the voice quality of the recovered voices obtained by using the different recovery methods, so that accuracy of the packet loss scenario label corresponding to the sample voice packet segment can be effectively improved, thereby improving an identification rate of the packet loss scenario by the obtained packet loss scenario determining model.

Optionally, in some possible implementations, the obtaining a first voice quality evaluation value corresponding to the first recovered voice, a second voice quality evaluation value corresponding to the second recovered voice, and a third voice quality evaluation value corresponding to the third recovered voice includes: obtaining a first mean opinion score (MOS) value corresponding to the first recovered voice, where the first MOS value is the first voice quality evaluation value; obtaining a second MOS value corresponding to the second recovered voice, where the second MOS value is the second voice quality evaluation value; and obtaining a third MOS value corresponding to the third recovered voice, where the third MOS value is the third voice quality evaluation value.

In this embodiment of this application, voice recovery quality corresponding to the recovered voices is determined by determining MOS values corresponding to the recovered voices. This can effectively improve flexibility of the solution.

A second aspect of this application provides a data processing apparatus. The data processing apparatus has functions of implementing the data processing method in the first aspect. The functions may be implemented by using hardware, or may be implemented by using hardware executing corresponding software. The hardware or the software includes one or more units corresponding to the foregoing functions.

A third aspect of embodiments of this application provides a data processing apparatus. The apparatus includes:

a processor, a memory, and an input/output interface, where the processor and the memory are connected to the input/output interface, the memory is configured to store program code, and when invoking the program code in the memory, the processor performs the steps of the method according to any one of the first aspect of this application or the implementations of the first aspect.

A fourth aspect of embodiments of this application provides a base station. The base station may include:

a processor, a memory, and an input/output interface, where the processor and the memory are connected to the input/output interface, the memory is configured to store program code, and when invoking the program code in the memory, the processor performs the steps of the method according to any one of the first aspect of this application or the implementations of the first aspect.

A fifth aspect of embodiments of this application provides a core network device. The core network device may include:

a processor, a memory, and an input/output interface, where the processor and the memory are connected to the input/output interface, the memory is configured to store program code, and when invoking the program code in the memory, the processor performs the steps of the method according to any one of the first aspect of this application or the implementations of the first aspect.

A sixth aspect of embodiments of this application provides a terminal. The terminal may include:

a processor, a memory, and an input/output interface, where the processor and the memory are connected to the input/output interface, the memory is configured to store program code, and when invoking the program code in the memory, the processor performs the steps of the method according to any one of the first aspect of this application or the implementations of the first aspect.

A seventh aspect of embodiments of this application provides a data processing apparatus. The data processing apparatus may be used in a device such as a base station, a core network device, or a terminal. The data processing apparatus is coupled to a memory, and is configured to read and execute instructions stored in the memory, so that the data processing apparatus implements the steps of the method according to any one of the first aspect of this application or the implementations of the first aspect. In a possible design, the data processing apparatus is a chip or a system-on-a-chip.

An eighth aspect of embodiments of this application provides a chip system. The chip system includes a processor, configured to support a base station, a core network device, or a terminal in implementing the functions in the foregoing aspects, for example, processing data and/or information in the foregoing methods. In a possible design, the chip system further includes a memory, and the memory is configured to store program instructions and data that are necessary to the base station, the core network device, or the terminal. The chip system may include a chip, or may include the chip and another discrete device.

The processor mentioned anywhere above may be a general-purpose central processing unit (CPU), a microprocessor, an application-specific integrated circuit (ASIC), or one or more integrated circuits for controlling program execution of the data search method according to the first aspect.

A ninth aspect of embodiments of this application provides a storage medium. It should be noted that technical solutions of embodiments of this application essentially, or a part contributing to a current technology, or all or a part of the technical solutions may be implemented in a form of a software product. The computer software product is stored in the storage medium, and is configured to store computer software instructions used by the foregoing device. The computer software product includes a program designed for a data processing apparatus such as a base station, a core network device, or a terminal for executing any one of the optional implementations of the first aspect.

The storage medium includes any medium that can store program code, for example, a USB flash drive, a removable hard disk, a read-only memory (ROM), a random access memory (RAM), a magnetic disk, or an optical disc.

A tenth aspect of embodiments of this application provides a computer program product including instructions. When the computer program product is run on a computer, the computer is enabled to perform the method according to any one of the first aspect of this application or the optional implementations of the first aspect.

An eleventh aspect of embodiments of this application provides a communication system. The communication system includes a base station, a core network device, and a terminal.

The base station may be the base station provided in the fourth aspect of the embodiments of this application.

The core network device may be the core network device provided in the fifth aspect of the embodiments of this application.

The terminal may be the terminal provided in the sixth aspect of the embodiments of this application.

It can be learned from the foregoing technical solutions that embodiments of this application have the following advantages:

Embodiments of this application provide the data processing method and the related apparatus. The packet loss scenario type is determined, and when the packet loss scenario type meets the data packet compensation condition, the compensation data packet is generated to compensate for the lost data packet. When the data packet compensation condition is met, data recovered by directly using the compensation data packet is closer to lost data. Therefore, compared with the PLC method, this method can achieve better data recovery effects with lower complexity, and improve adaptability in various packet loss scenarios.

DESCRIPTION OF EMBODIMENTS

Embodiments of this application provide a data processing method and a related apparatus, to achieve better data recovery effects with lower complexity than those achieved using a PLC method, and improve adaptability in various packet loss scenarios.

The data processing method provided in this application may be applied to various communication systems or communication networks, for example, a 5th generation mobile communication technology (5G) system, a new radio (NR) communication system, a long term evolution (long term evolution, LTE) system, a global system for mobile communications (GSM) or a code division multiple access (CDMA) network, or a wideband code division multiple access (WCDMA) network, or may be another communication network or communication system such as a worldwide interoperability for microwave access (WiMAX) system or a wireless local area network (WLAN).

Figure 1:
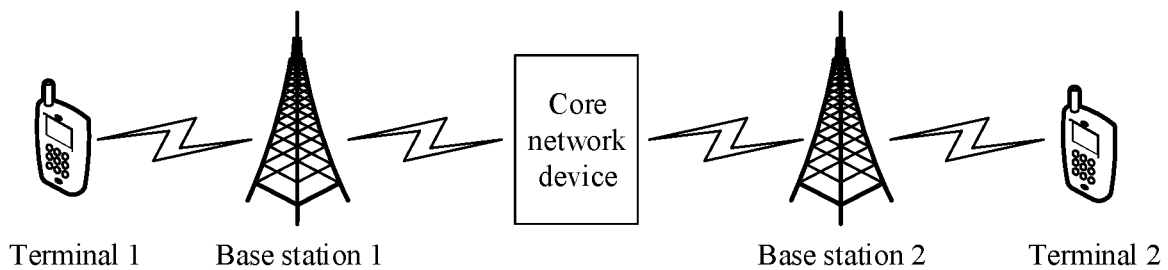
FIG. 1 is a schematic diagram of an application scenario of a data processing method according to an embodiment of this application.

For example, a specific application scenario of embodiments of this application may be shown in FIG. 1. Specifically, the application scenario may include one or more terminals, one or more base stations, or one or more core network devices. As shown in FIG. 1, the terminal may access the base station, and the base station may access the core network device. In a process of uplink data transmission from the terminal to the base station (for example, uplink data transmission from a terminal 1 to a base station 1 in FIG. 1), if a data packet is lost, the base station may perform data processing by using the data processing method provided in embodiments of this application, to recover data. Alternatively, in a process of forwarding data by the base station to the core network device (for example, forwarding data by the base station 1 to the core network device in FIG. 1), if a data packet is lost, the core network device may perform data processing by using the data processing method provided in embodiments of this application, to recover data. Alternatively, in a process of forwarding data by the core network device to the base station (for example, forwarding data by the core network device to a base station 2 in FIG. 1, where the base station 1 and the base station 2 may be a same base station or different base stations), if a data packet is lost, the base station may perform data processing by using the data processing method provided in embodiments of this application, to recover data. Alternatively, in a process of downlink data transmission from the base station to the terminal (for example, downlink data transmission from the base station 2 to a terminal 2 in FIG. 1), if a data packet is lost, the terminal may perform data processing by using the data processing method provided in embodiments of this application, to recover data.

Therefore, the data processing method provided in embodiments of this application may be performed by various data processing apparatuses. The data processing apparatus may be a network device such as a base station, a core network device, or a terminal, or the data processing apparatus may be included in the network device such as the base station, the core network device, or the terminal. The base station may be in various forms, such as a macro base station, a micro base station (also referred to as a small cell), a relay station, or an access point. In different communication systems, the base station may have different names. For example, the base station may be a base transceiver station (BTS) in a GSM or CDMA network, an NB (NodeB) in WCDMA, or an evolved nodeB (eNB or eNodeB) in an LTE system, or may be a base station device in a 5G network or a communication apparatus in a future evolved public land mobile network (public land mobile network, PLMN), for example, a 5G base station (gNB). The terminal may be any handheld device, wearable device, or computing device with a communication function, another processing device connected to a wireless modem, or the like. For example, the terminal may be a mobile station (MS), a subscriber unit (subscriber unit), a cellular phone, a smartphone, a wireless data card, a personal digital assistant (PDA) computer, a tablet computer, a wireless modem, a handheld device, a laptop computer, or a machine type communication (MTC) terminal.

It should be understood that the data processing method provided in embodiments of this application may be performed by the foregoing various independent data processing apparatuses or data processing apparatuses in devices such as the base station and the terminal. The following describes in detail, based on the data processing apparatus, a specific procedure of the data processing method provided in embodiments of this application.

Figure 2:
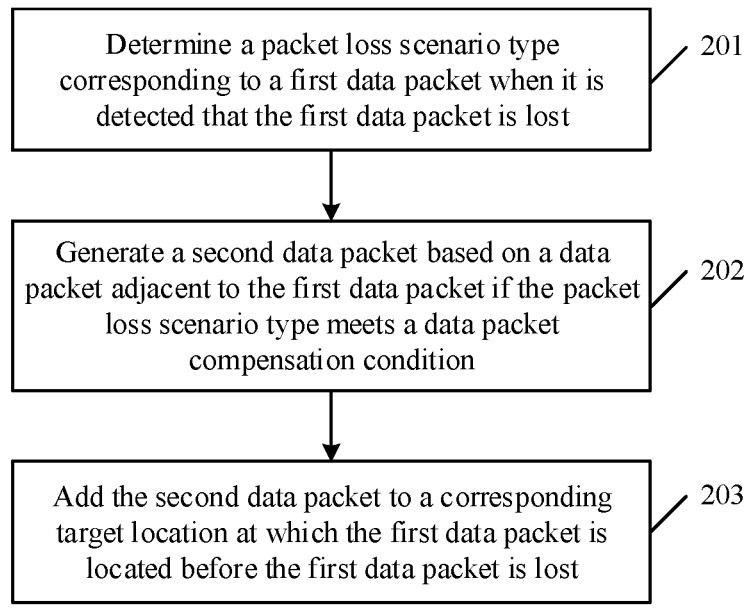
FIG. 2 is a schematic flowchart of a data processing method according to an embodiment of this application.

FIG. 2 is a schematic flowchart of a data processing method according to an embodiment of this application. The data processing method provided in this embodiment of this application may include the following steps.

201: Determine a packet loss scenario type corresponding to a first data packet when detecting that the first data packet is lost.

In a data transmission process, a data sending network device usually divides data into several small blocks, and sends the data by using each small block of data as a transmission unit. Such a transmission unit is usually referred to as a data packet. That is, a data receiving network device may usually receive the data in a form of several data packets. However, a data packet loss event may occur because the data transmission process is subject to various factors such as hardware of the network device or a network environment. To be specific, data packets received by the data receiving network device are not continuous and complete, and one or more data packets may not be received. Therefore, in the case of data packet loss, the data receiving network device may usually recover data corresponding to the lost data packet after detecting the lost data packet, to ensure integrity of data received by the network device as much as possible.

Before sending data packets, the data sending network device usually marks the data packets with sequence numbers according to a sequence. To be specific, each data packet has a unique sequence number, and sequence numbers corresponding to continuously sent data packets are also continuous. Therefore, the data receiving network device may detect whether a data packet is lost by detecting the sequence number corresponding to the received data packet. For example, in the data transmission process, the data receiving network device receives five data packets, and sequence numbers corresponding to the five data packets are 001, 002, 004, 005, and 006 respectively. It is clear that a data packet whose sequence number is 003 is missing between the data packet whose sequence number is 002 and the data packet whose sequence number is 004, and the network device does not receive the data packet whose sequence number is 003. If the network device does not receive the data packet whose sequence number is 003 within a period of time, it may be considered that the data packet whose sequence number is 003 is lost. That is, the network device detects that the data packet whose sequence number is 003 is lost.

In some optional embodiments, the first data packet may be specifically a voice data packet, namely, a data packet for transmission of voice information. For example, in a real-time call process between terminals, a sending terminal performs encoding processing and compression on a voice signal obtained in real time, to obtain a voice data packet for transmission. Then, the sending terminal forwards the voice data packet to a receiving terminal via a network device such as a base station and a core network device. The receiving terminal may receive the voice data packet sent by the sending terminal, and process the voice data packet to obtain the corresponding voice signal. In addition, the first data packet may alternatively be a video data packet, an audio/video data packet, or another type of data packet, namely, a data packet for transmission of video information or audio/video information. A specific transmission process is similar to the foregoing transmission process of the voice data packet, and details are not described herein again. In this embodiment, the first data packet may be but is not limited to a data packet such as the voice data packet, the video data packet, or the audio/video data packet. For ease of description, the following describes in detail the data processing method provided in this embodiment of this application by using an example in which the first data packet is the voice data packet.

In some optional embodiments, if detecting that the first data packet is lost in the data transmission process, the data receiving network device may determine, based on an associated data packet corresponding to the first data packet, the packet loss scenario type corresponding to the first data packet. Specifically, the associated data packet may be M adjacent data packets previous to the first data packet, N adjacent data packets following the first data packet, or M adjacent data packets previous to the first data packet and N adjacent data packets following the first data packet. M is an integer greater than or equal to 1, N is an integer greater than or equal to 1, and M and N may be a same integer or may be different integers. This is not specifically limited herein.

For example, when receiving the data packets whose sequence numbers are 001, 002, 004, 005, and 006 respectively, the data receiving network device may determine, based on an associated data packet corresponding to the lost data packet (namely, the data packet whose sequence number is 003), a packet loss scenario type corresponding to the lost data packet. The associated data packet may be specifically M adjacent data packets previous to the lost data packet, for example, the data packet whose sequence number is 002 or the two data packets whose sequence numbers are 002 and 001. Alternatively, the associated data packet may be N adjacent data packets following the lost data packet, for example, the data packet whose sequence number is 004, the two data packets whose sequence numbers are 004 and 005, or the three data packets whose sequence numbers are 004, 005, and 006. In addition, the associated data packet may alternatively be M adjacent data packets previous to the lost data packet and N adjacent data packets following the lost data packet, for example, the two data packets whose sequence numbers are 002 and 004 or the five data packets whose sequence numbers are 001, 002, 004, 005, and 006. Details are not described herein.

In addition, in some continuous packet loss scenarios, corresponding packet loss scenario types may be determined separately based on different associated data packets. That is, when a plurality of continuous data packets are all lost, for the plurality of lost data packets, associated data packets corresponding to the lost data packets may be different. For example, when receiving data packets whose sequence numbers are 001, 002, 006, and 007 respectively, the data receiving network device may determine that lost data packets are the data packets whose sequence numbers are 003, 004, and 005. For the lost data packet whose sequence number is 003, an associated data packet corresponding to the lost data packet may be M adjacent data packets previous to the lost data packet, for example, the data packet whose sequence number is 002 or the two data packets whose sequence numbers are 002 and 001. For the lost data packet whose sequence number is 005, an associated data packet corresponding to the lost data packet may be N adjacent data packets following the lost data packet, for example, the data packet whose sequence number is 006 or the two data packets whose sequence numbers are 006 and 007. For the lost data packet whose sequence number is 004, the data packet cannot be compensated for through data packet compensation because two adjacent data packets (namely, the two data packets whose sequence numbers are 003 and 004) of the data packet are both lost. Therefore, a packet loss scenario type corresponding to the data packet may be directly determined as a packet loss scenario in which no data packet compensation is required, and compensation is not performed for the data packet.

In some optional embodiments, determining the packet loss scenario type based on the associated data packet corresponding to the first data packet may be specifically performed as follows: determining the corresponding packet loss scenario type based on a packet loss scenario determining model and a coding parameter of the associated data packet. Specifically, after it is detected that the first data packet is lost, the associated data packet corresponding to the first data packet may be determined, and the coding parameter corresponding to the associated data packet is obtained. When the associated data packet is a voice data packet, a voice coding parameter corresponding to the associated data packet may be obtained. For example, when the associated data packet is coded by using an algebraic code-excited linear prediction (ACELP) coding scheme, the following parameters of the associated data packet may be obtained: an adaptive codebook index, an adaptive codebook gain parameter, and a fixed codebook gain parameter. It should be noted that, when the associated data packet is coded by using another voice coding scheme, a corresponding voice coding parameter of the associated data packet in the coding scheme may be obtained. Details are not described herein. Each voice data packet has a corresponding voice coding parameter. Therefore, when there are a plurality of associated data packet, voice coding parameters of the associated data packets may be obtained to form a parameter list. Then, the voice coding parameters in the parameter list are input into a pre-trained packet loss scenario model. Finally, the packet loss scenario type corresponding to the first data packet is determined based on an output result of the packet loss scenario determining model.

202: Generate a second data packet based on a data packet adjacent to the first data packet if the packet loss scenario type meets a data packet compensation condition.

In this embodiment of this application, after detecting that the first data packet is lost, if determining that the packet loss scenario type corresponding to the first data packet meets the data packet compensation condition, the data receiving network device may generate the second data packet based on the data packet adjacent to the first data packet. The data packet adjacent to the first data packet is a data packet in received data packets that is adjacent to the first data packet. For example, when the network device receives the data packets whose sequence numbers are 001, 002, 004, 005, and 006 respectively, the data packet whose sequence number is 003 is a lost data packet (namely, the first data packet), and the data packet whose sequence number is 002 and the data packet whose sequence number is 004 are received data packets that are adjacent to the lost data packet. Therefore, the second data packet may be generated based on the data packet whose sequence number is 002 or the data packet whose sequence number is 004.

In some optional embodiments, the generating a second data packet based on a data packet adjacent to the first data packet may specifically include: copying the data packet adjacent to the first data packet, and modifying some parameters of the copied data packet to be the same as parameters of the first data packet, to obtain the second data packet. Specifically, a data structure of a data packet usually includes two parts: a header and a body. Information carried in the header is mainly parameter information related to the data packet, for example, parameter information such as information used to declare a type of data in the data packet, a size of the data packet, and a sequence number corresponding to the data packet. Information carried in the body is data content corresponding to the data packet. For example, for a voice data packet, information carried in a body is voice data content obtained through encoding processing. Therefore, in this embodiment, after the data packet adjacent to the first data packet is copied, a part of the parameter information in the header of the copied data packet may be modified, so that the parameter information in the header of the data packet is the same as parameter information in a header of the first data packet. For example, when receiving the data packets whose sequence numbers are 001, 002, 004, 005, and 006 respectively, the network device may determine that the sequence number of the lost first data packet is 003, may obtain a copied data packet by copying the data packet whose sequence number is 002 or the data packet whose sequence number is 004, and modify sequence number information carried in a header of the copied data packet to 003, to obtain the second data packet. The second data packet can be used to replace the lost first data packet.

It should be noted that, in some optional embodiments, for voice data packets, in addition to identifying a sequence of the voice data packets by using sequence numbers, timestamps may also be used to identify a sequence of the voice data packets. For example, for a voice of several seconds, a plurality of data packets are used to send the voice. Each data packet carries voice data within a fixed time segment. For example, the $1^{st}$ data packet carries voice data within 0 ms to 20 ms, the $2^{nd}$ data packet carries voice data within 20 ms to 40 ms, the $3^{rd}$ data packet carries voice data within 40 ms to 60 ms, and so on. Different data packets carry voice data within different time segments. A complete voice may be obtained by combining all the data packets. In this case, a header of each data packet usually carries timestamp information corresponding to the data packet. For example, the $1^{st}$ data packet usually carries information of a timestamp ranging from 0 ms to 20 ms, and the $2^{nd}$ data packet usually carries information of a timestamp ranging from 20 ms to 40 ms. Therefore, after the copied data packet is obtained, in addition to modifying the sequence number corresponding to the copied data packet, the timestamp corresponding to the data packet may be further changed, so that the finally obtained second data packet can be used to replace the lost first data packet. For example, when receiving the data packets whose sequence numbers are 001, 002, 004, 005, and 006 respectively, the network device may determine that the sequence number of the lost first data packet is 003. The network device may obtain the copied data packet by copying the data packet whose sequence number is 002 or the data packet whose sequence number is 004, and modify the sequence number carried in the header of the copied data packet to 003. Second, when the data packet carries timestamp information, timestamp information corresponding to the copied data packet may be determined based on the data packet whose sequence number is 002 and the data packet whose sequence number is 004. For example, when timestamp information corresponding to the data packet whose sequence number is 002 is 20 ms to 40 ms, and timestamp information corresponding to the data packet whose sequence number is 004 is 60 ms to 80 ms, it may be determined that the timestamp information corresponding to the copied data packet is 40 ms to 60 ms. Therefore, the timestamp information corresponding to the copied data packet may be modified to 40 ms to 60 ms, to obtain the second data packet. The second data packet can be used to replace the lost first data packet.

In some optional embodiments, the packet loss scenario type may specifically include a first packet loss scenario, a second packet loss scenario, and a third packet loss scenario, and the data packet compensation condition may specifically include a first compensation condition and a second compensation condition. The first packet loss scenario meets the first compensation condition, and the second packet loss scenario meets the second compensation condition. To be specific, when the packet loss scenario type is the first packet loss scenario or the second packet loss scenario, the data packet compensation condition is met, and when the packet loss scenario type is the third packet loss scenario, the data packet compensation condition is not met.

When the packet loss scenario type is the first packet loss scenario, the second data packet may be specifically generated based on an adjacent data packet previous to the first data packet. For example, when the sequence number of the lost first data packet is 003, the second data packet is generated based on the adjacent data packet (namely, the data packet whose sequence number is 002) previous to the first data packet. The first packet loss scenario may be specifically a scenario in which voice parameter content of the first data packet is relatively close to voice parameter content of a data packet previous to the first data packet, but is greatly different from voice parameter content of a data packet following the first data packet. Therefore, in the first packet loss scenario, the second data packet used to replace the first data packet is generated based on the adjacent data packet previous to the first data packet, so that a finally recovered voice is closer to an original voice, and a better voice recovery effect can be obtained.

When the packet loss scenario type is the second packet loss scenario, the second data packet may be specifically generated based on an adjacent data packet following the first data packet. For example, when the sequence number of the lost first data packet is 003, the second data packet is generated based on the adjacent data packet (namely, the data packet whose sequence number is 004) following the first data packet. The second packet loss scenario may be specifically a scenario in which voice parameter content of the first data packet is relatively close to voice parameter content of a data packet following the first data packet, but is greatly different from voice parameter content of a data packet previous to the first data packet. Therefore, in the second packet loss scenario, the second data packet used to replace the first data packet is generated based on the adjacent data packet following the first data packet, so that a finally recovered voice is closer to an original voice, and a better voice recovery effect can be obtained.

When the packet loss scenario type is the third packet loss scenario, if the data receiving network device is a base station or a core network device, the base station or the core network device does not need to perform packet compensation for the first data packet, and may forward a received data packet in a normal processing manner after the data packet is lost. For example, when the base station or the core network device receives the data packets whose sequence numbers are 001, 002, 004, 005, and 006 respectively, the base station or the core network device first forwards the data packets whose sequence numbers are 001 and 002. After waiting for a period of time, if the data packet whose sequence number is 003 is still not received, the base station or the core network device continues to sequentially forward the data packets whose sequence numbers are 004 to 006. In addition, if the data receiving network device is a terminal, the terminal needs to perform decoding processing on a received voice data packet to obtain a corresponding voice signal. Therefore, when receiving data packets whose sequence numbers are 001, 002, 004, 005, and 006 respectively, the terminal may reconstruct, in a decoding processing process and by using a PLC method, a voice waveform corresponding to the data packet whose sequence number is 003, to implement waveform compensation for the data packet whose sequence number is 003.

203: Add the second data packet to a corresponding target location at which the first data packet is located before the first data packet is lost.

In this embodiment, after generating the second data packet, the network device may add the second data packet to the corresponding target location in an entire data packet sequence before the first data packet is lost. That is, the second data packet is used to replace the first data packet before the first data packet is lost, to implement packet compensation for the first data packet.

When the network device is the base station, after adding the second data packet to the corresponding target location at which the first data packet is located before the first data packet is lost, the network device may send the second data packet to the core network device or the terminal according to a sending sequence of the data packets. For example, when receiving the data packets whose sequence numbers are 001, 002, 004, 005, and 006 respectively, the network device may generate the second data packet based on the data packet whose sequence number is 002 or 004, then add the second data packet between the data packet whose sequence number is 002 and the data packet whose sequence number is 004, and sequentially forward the data packets to the core network device or the terminal based on the sequence numbers of the received data packets, so that the core network device or the terminal can receive a complete data packet sequence.

Similarly, when the network device is the core network device, after adding the second data packet to the corresponding target location at which the first data packet is located before the first data packet is lost, the network device may send the second data packet to the base station according to the sending sequence of the data packets, so that the base station can receive the complete data packet sequence.

In addition, when the network device is the terminal, after adding the second data packet to the corresponding target location at which the first data packet is located before the first data packet is lost, the network device may perform decoding processing on the entire complete data packet sequence according to the sequence of the data packets, to obtain corresponding voice data, and does not need to reconstruct a waveform of the first data packet by using the PLC method.

It should be noted that voice data packets are correlated in voice encoding and decoding, and a voice waveform obtained by decoding the voice data packets is essentially obtained by recovering content of a plurality of voice data packets. Therefore, in this embodiment of this application, although two voice data packets including same content are obtained after the second data packet is generated based on the data packet adjacent to the first data packet, waveform parts corresponding to the two same voice data packets are actually different in a finally generated waveform. In addition, when the voice parameter content included in the lost first data packet is relatively close to the voice parameter content included in the second data packet, the second data packet is used to implement packet compensation for the first data packet, so that the finally obtained voice waveform is closer to an original voice waveform before the packet is lost, thereby achieving a good voice recovery effect.

In addition, in the PLC method, interpolation filtering is mainly performed on some important parameters of a plurality of voice packets before a voice packet is lost, and a waveform of the lost voice packet is reconstructed based on these parameters and a buffered voice waveform. Therefore, the PLC method has higher complexity. However, in this embodiment of this application, the second data packet used to replace the first data packet is generated by copying the data packet adjacent to the first data packet, to implement packet compensation. Interpolation filtering does not need to be performed on some important parameters of the plurality of voice packets, and the voice waveform does not need to be reconstructed based on parameters through audio synthesis, so that the voice can be recovered with low complexity.

In addition, in some voice coding schemes, such as an adaptive multi-rate (Adaptive Multi-Rate, AMR) coding scheme and an adaptive multi-rate wideband (Adaptive Multi-Rate Wideband, AMR-WB) coding scheme, in the PLC method, extrapolation and attenuation may be mainly performed on coding parameters corresponding to a plurality of voice packets previous to the lost voice packet, to generate a voice parameter of the lost voice packet. Then, a lost waveform is recovered based on the generated voice parameter. When the voice parameter of the lost voice packet is greatly different from voice parameters of a plurality of voice packets previous to the lost voice packet, and is slightly different from a voice parameter of a voice packet following the lost voice packet, after the lost voice packet is compensated for by copying the data packet following the lost voice packet, a recovered voice is better than a voice recovered by using the PLC method. In addition, when the parameter of the lost voice packet is relatively close to a voice parameter of a voice packet previous to the lost voice packet, in the PLC method, extrapolation and attention may be mainly performed on the coding parameters corresponding to the plurality of voice packets previous to the lost voice packet. Therefore, after the data packet previous to the lost voice packet is directly copied to compensate for the lost voice packet, a recovered voice is also better than the voice recovered by using the PLC method.

In this embodiment of this application, when detecting that the first data packet is lost in the data transmission process, the packet loss scenario type corresponding to the first data packet is determined. Then, when the packet loss scenario type meets the data packet compensation condition, a compensation data packet is generated to compensate for the lost data packet. When the data packet compensation condition is met, data recovered by directly using the compensation data packet is closer to lost data. Therefore, compared with the PLC method, this method can achieve better data recovery effects with lower complexity, and improve adaptability in various packet loss scenarios.

Figure 3A:
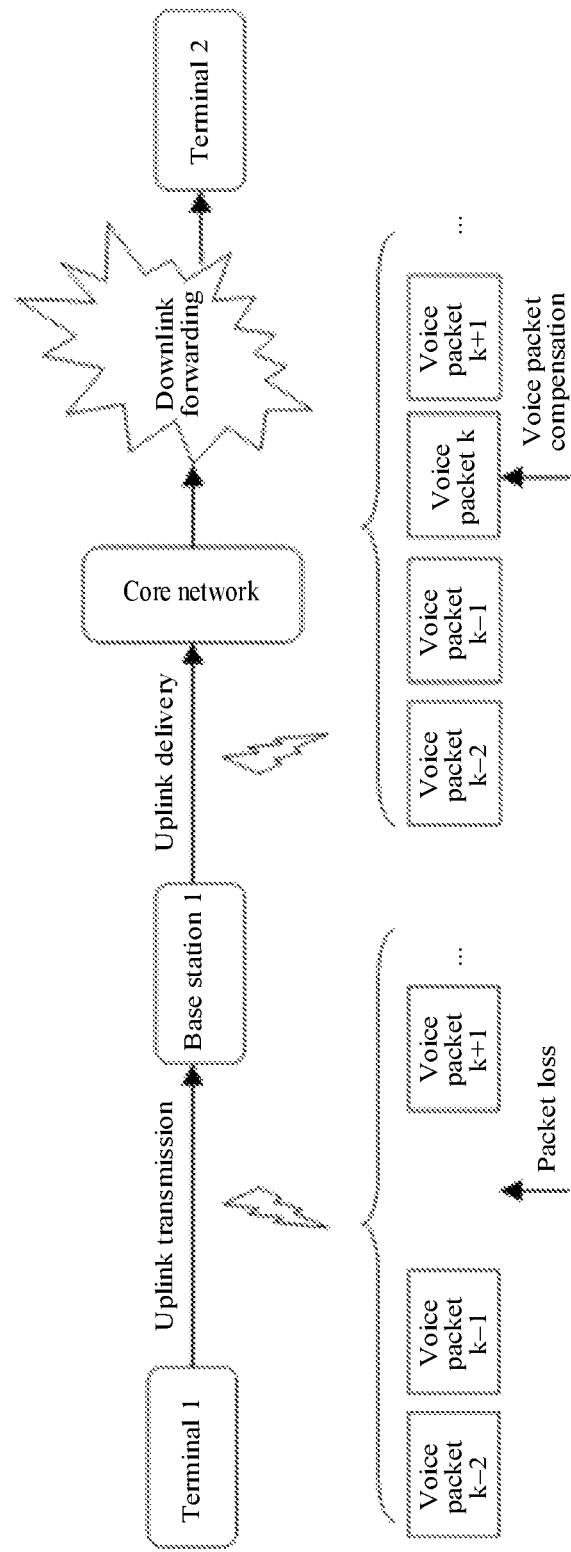
FIG. 3a is a diagram of an application example of a data processing method according to an embodiment of this application.
Figure 3B:
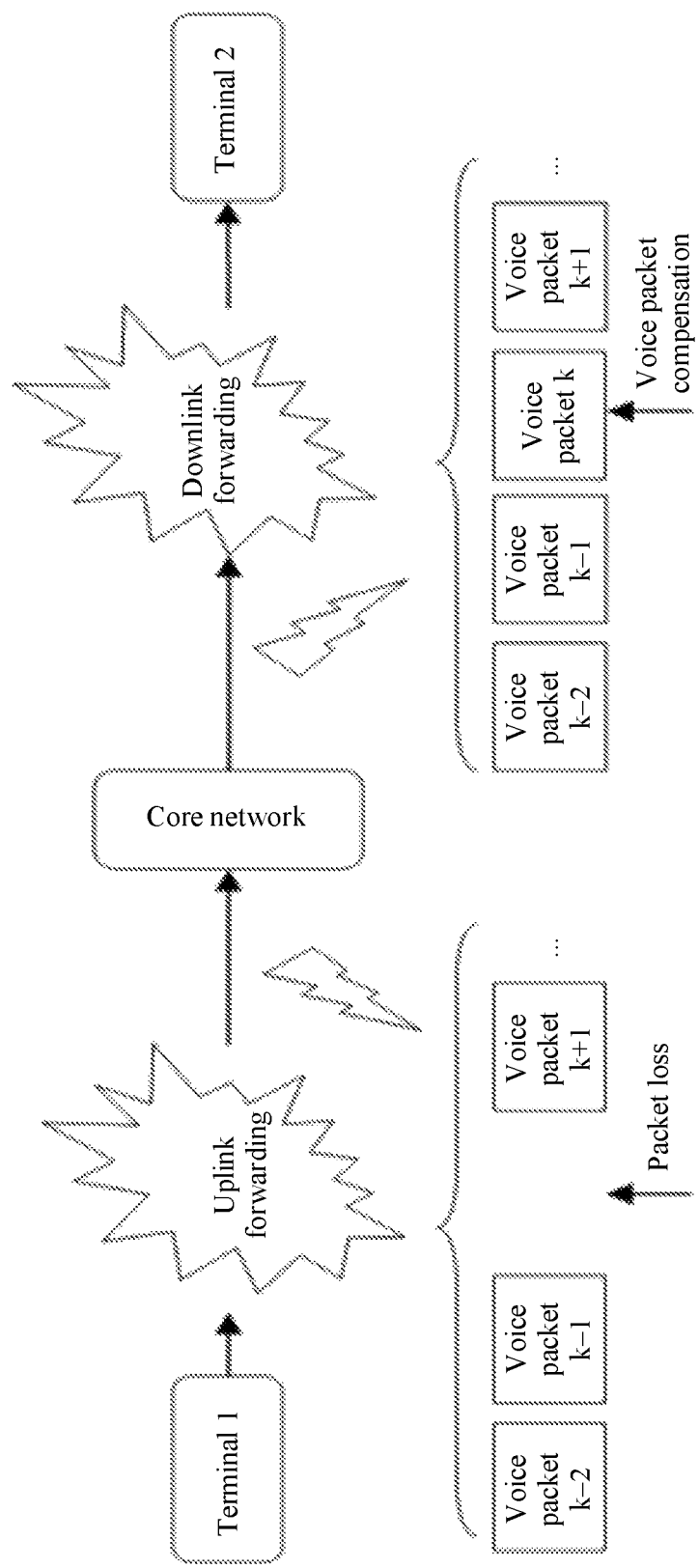
FIG. 3b is a diagram of an application example of another data processing method according to an embodiment of this application.
Figure 3C:
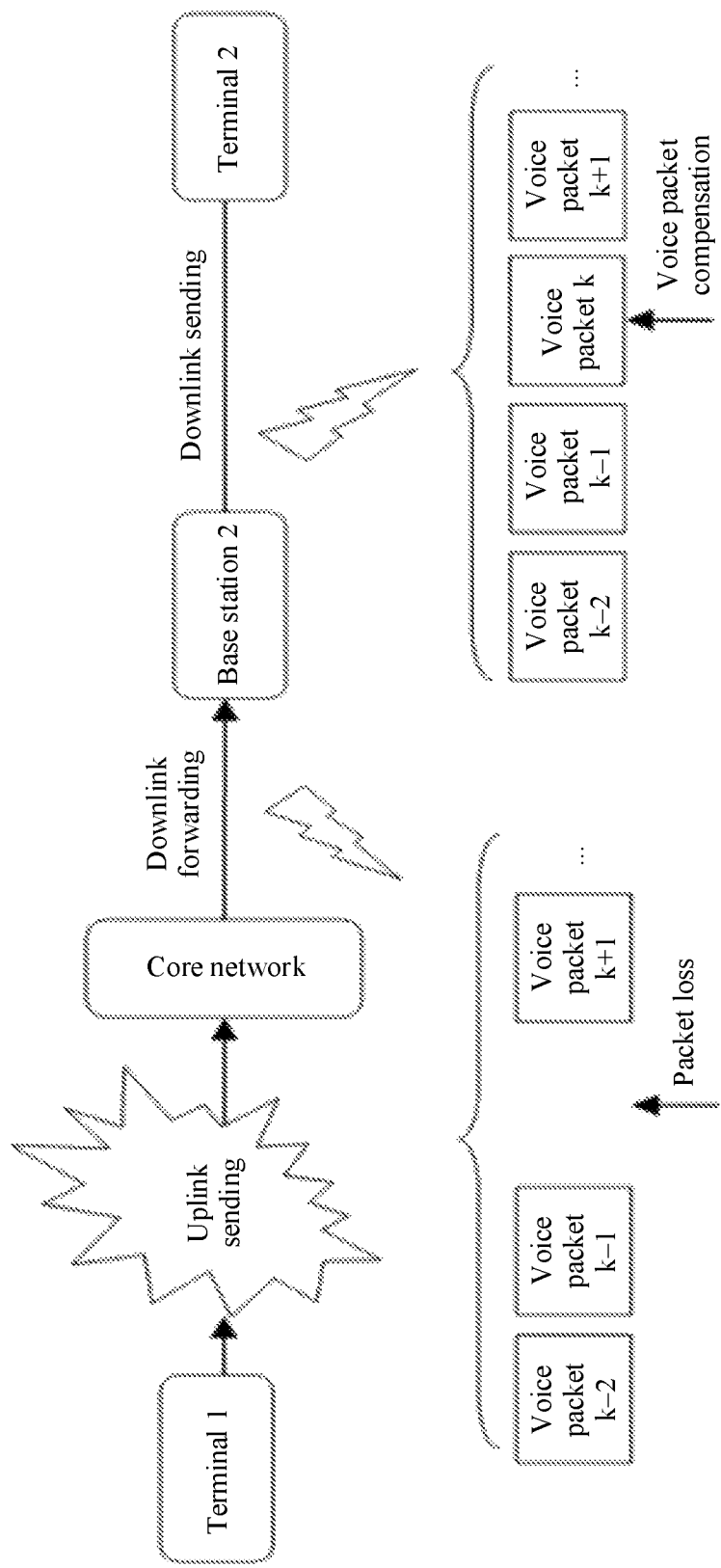
FIG. 3c is a diagram of an application example of another data processing method according to an embodiment of this application.
Figure 3D:
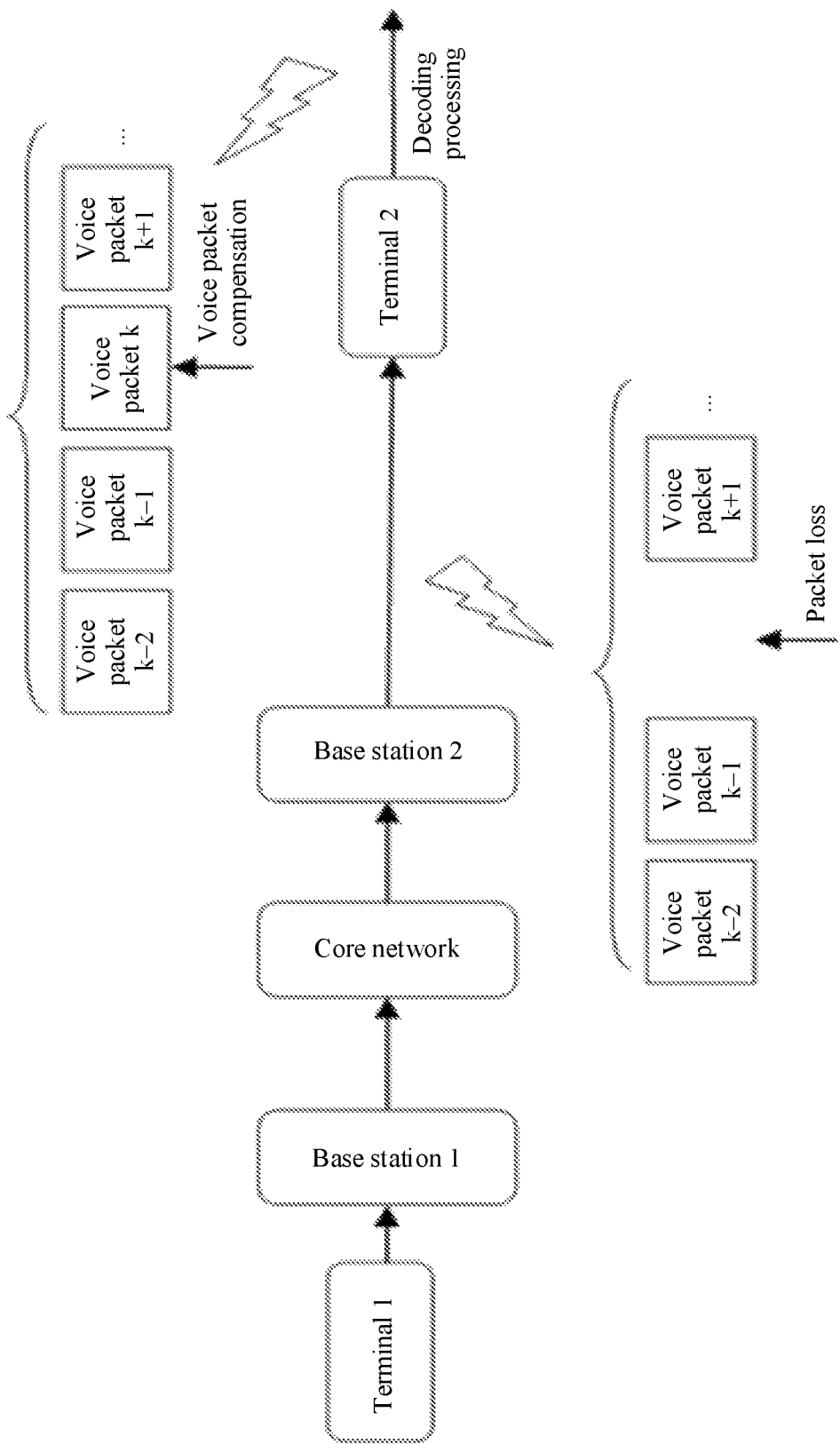
FIG. 3d is a diagram of an application example of another data processing method according to an embodiment of this application.

For ease of understanding, the following describes in detail the data processing method provided in this embodiment of this application with reference to diagrams of specific scenario examples. Specifically, refer to FIG. 3a to FIG. 3d. FIG. 3a is a diagram of an application example of the data processing method according to an embodiment of this application. FIG. 3b is a diagram of another application example of the data processing method according to an embodiment of this application. FIG. 3c is a diagram of another application example of the data processing method according to an embodiment of this application. FIG. 3d is a diagram of another application example of the data processing method according to an embodiment of this application.

FIG. 3a shows a scenario in which a base station 1 performs the data processing method provided in this embodiment of this application when a voice data packet is lost in a process in which the terminal 1 performs uplink transmission of voice data packets to a base station 1. FIG. 3b shows a scenario in which a core network device performs the data processing method provided in this embodiment of this application when a voice data packet is lost in a process in which a base station 1 forwards, to the core network device, voice data packets transmitted by the terminal 1 in an uplink. FIG. 3c shows a scenario in which a base station 2 performs the data processing method provided in this embodiment of this application when a voice data packet is lost in a process in which a core network device performs downlink forwarding of voice data packets to the base station 2. FIG. 3d shows a scenario in which a terminal 2 performs the data processing method provided in this embodiment of this application when a voice data packet is lost in a process in which a base station 2 performs downlink sending of voice data packets to the terminal 2.

For ease of description, the following describes in detail the data processing method provided in this embodiment of this application by using the scenario shown in FIG. 3a as an example.

In a real-time call process between the terminal 1 and a terminal 2, the terminal 1 first performs encoding processing and data encapsulation processing on an obtained voice signal, to obtain the voice data packets. Then, the terminal 1 sends the voice data packets to the base station 1 in a specific sequence. The base station 1 then performs uplink delivery of the received voice data packets to a core network device. After receiving the voice data packets sent by the base station 1, the core network device performs downlink forwarding of the voice data packets to a base station 2 accessed by the terminal 2. The base station 2 sends the voice data packets to the terminal 2. In this way, the voice data packets are transmitted between the terminal 1 and the terminal 2. The base station 1 and the base station 2 may be a same base station or different base stations.

In a process in which the terminal 1 transmits the voice data packets to the base station 1, if the base station 1 detects that a voice data packet k transmitted by the terminal 1 is lost, the base station 1 determines a packet loss scenario type corresponding to the voice data packet k. A specific method for detecting, by the base station 1, that the voice data packet k transmitted by the terminal 1 is lost may be as follows: After the base station 1 receives a voice data packet k−1 (namely, a voice data packet previous to the voice data packet k) transmitted by the terminal 1, if the base station 1 still does not receive the voice data packet k after waiting for a specific period of time, it may be considered that the voice data packet k is lost. Therefore, the base station 1 may detect that the voice data packet k is lost. After detecting that the voice data packet k is lost, the base station 1 may obtain a voice coding parameter of an associated data packet corresponding to the voice data packet k, for example, obtain voice coding parameters of voice data packets such as the voice data packet k−1, a voice data packet k−2, a voice data packet k+1, and a voice data packet k+2, then input the obtained voice coding parameters into a preconfigured packet loss scenario determining model, and determine, based on an output result of the packet loss scenario determining model, the packet loss scenario type corresponding to the voice data packet k.

If the base station 1 determines that the packet loss scenario type corresponding to the voice data packet k is the first packet loss scenario, the base station 1 obtains a copied voice data packet by copying the voice data packet k−1, and modifies sequence number information and/or timestamp information in a header of the copied voice data packet to information matching with the voice data packet k, to obtain a new voice data packet k. The new voice data packet k can be used to replace the original lost voice data packet k. Finally, the base station 1 sends the new voice data packet k and a subsequent voice data packet of the new voice data packet k to the core network device based on a sequence of the voice data packets, so that the core network device can receive a continuous and complete voice data packet sequence.

Similarly, if the base station 1 determines that the packet loss scenario type corresponding to the voice data packet k is the second packet loss scenario, the base station 1 obtains a copied voice data packet by copying the voice data packet k+1, and modifies sequence number information and/or timestamp information in a header of the copied voice data packet to information matching with the voice data packet k, to obtain a new voice data packet k. The new voice data packet k can be used to replace the original lost voice data packet k. Finally, the base station 1 sends the new voice data packet k and a subsequent voice data packet of the new voice data packet k to the core network device based on a sequence of the voice data packets, so that the core network device can receive a continuous and complete voice data packet sequence.

In addition, if the base station 1 determines that the packet loss scenario type corresponding to the voice data packet k is the third packet loss scenario, the base station 1 no longer performs packet compensation for the lost voice data packet k. After sending the voice data packet k−1, the base station 1 directly sends the voice data packet k+1 and a subsequent voice data packet k+1 to the core network device. That is, the core network device finally receives a voice data packet sequence excluding the voice data packet k.

Similarly, in the scenarios in which the core network device and the base station 2 perform the data processing method provided in this embodiment of this application, steps performed by the core network device and steps performed by the base station 2 are similar to the steps performed by the base station 1, and details are not described herein again. It should be noted that, in the scenario in which the terminal 2 performs the data processing method provided in this embodiment of this application, after the terminal 2 determines that the packet loss scenario type corresponding to the voice data packet k is the third packet loss scenario, steps performed by the terminal 2 are different from the steps performed by the base station 1, and another step is similar to the step performed by the base station 1. Specifically, if the terminal 2 determines that the packet loss scenario type corresponding to the voice data packet k is the third packet loss scenario, in a process in which the terminal 2 performs decoding processing on the voice data packets, the terminal 2 may reconstruct a voice waveform corresponding to the voice data packet k by using the PLC method, to reconstruct the waveform of the voice data packet k and recover a voice.

Figure 3E:
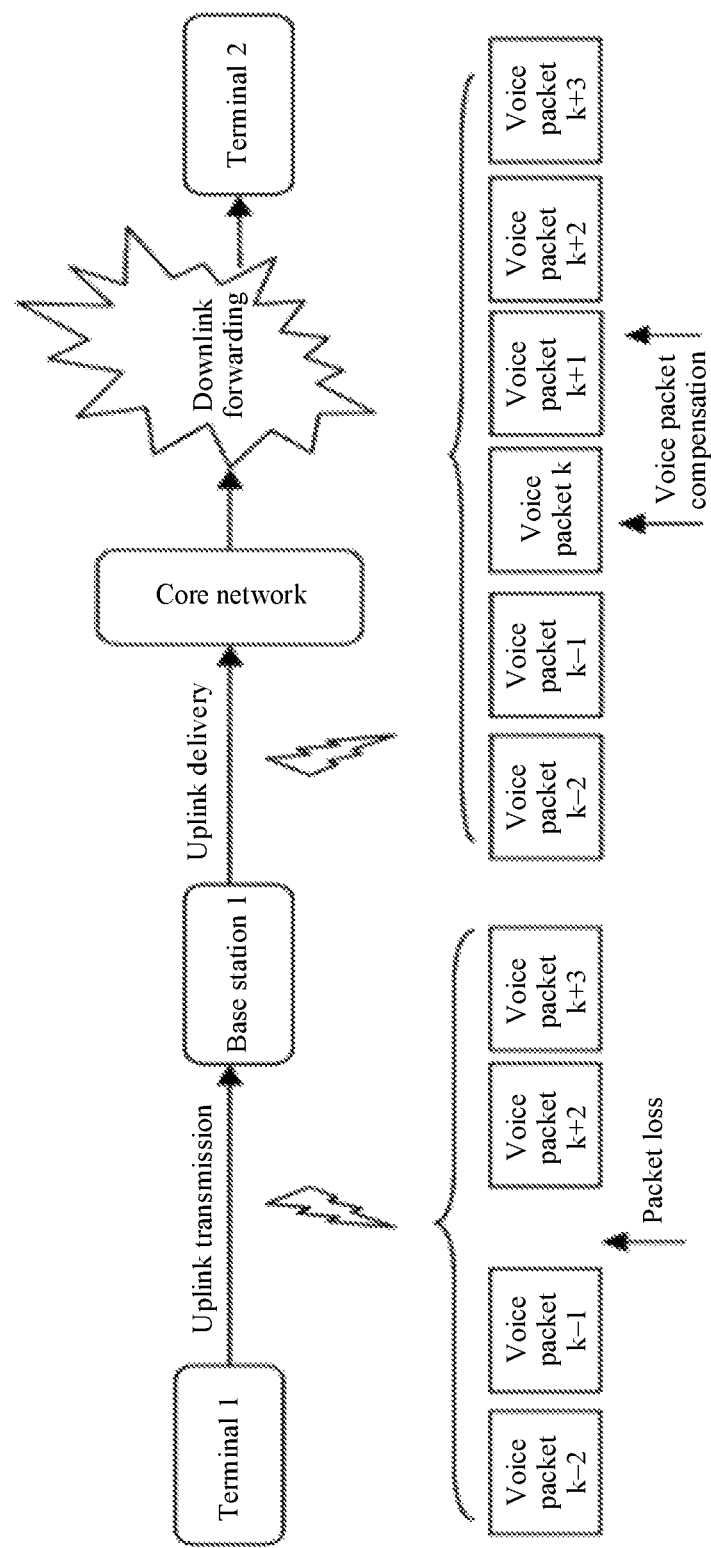
FIG. 3e is a diagram of an application example of another data processing method according to an embodiment of this application.

In addition, refer to FIG. 3e. FIG. 3e is a diagram of an application example of another data processing method according to an embodiment of this application. A scenario shown in FIG. 3e is similar to the scenario shown in FIG. 3a. Both FIG. 3a and FIG. 3e show the scenario in which the base station 1 performs the data processing method provided in this embodiment of this application when the voice data packet is lost in the process in which the terminal 1 performs uplink transmission of the voice data packets to the base station 1. A difference between FIG. 3e and FIG. 3a is that FIG. 3e shows that a plurality of continuous voice data packets are lost in the process in which the terminal 1 performs uplink transmission of the voice data packets to the base station 1.

In a process in which the terminal 1 transmits the voice data packets to the base station 1, if the base station 1 detects that a voice data packet k and a voice data packet k+1 transmitted by the terminal 1 are lost, the base station 1 determines a packet loss scenario type corresponding to the voice data packet k and a packet loss scenario type corresponding to the voice data packet k+1. Specifically, one or more adjacent voice data packets previous to the voice data packet k are first determined as associated data packets corresponding to the voice data packet k, for example, a voice data packet k−1 or a voice data packet k−2. Then, voice coding parameters of the corresponding associated data packets are obtained, the obtained voice coding parameters are input into the preconfigured packet loss scenario determining model, and the packet loss scenario type corresponding to the voice data packet k is determined based on an output result of the packet loss scenario determining model. In addition, one or more adjacent voice data packets following the voice data packet k+1 are also determined as associated data packets corresponding to the voice data packet k+1, for example, a voice data packet k+2 or a voice data packet k+3. Then, voice coding parameters of the corresponding associated data packets are obtained, the obtained voice coding parameters are input into the preconfigured packet loss scenario determining model, and the packet loss scenario type corresponding to the voice data packet k+1 is determined based on an output result of the packet loss scenario determining model.

It should be noted that, because the adjacent voice data packet following the voice data packet k is already lost, the voice data packet k cannot be compensated for by using the adjacent voice data packet following the voice data packet k. Therefore, after the packet loss scenario type corresponding to the voice data packet k is determined, the voice data packet k may be specifically compensated for by using an adjacent voice data packet previous to the voice data packet k, or the voice data packet k is not compensated for. Therefore, the packet loss scenario determining model may be preprocessed, so that when outputting a packet loss scenario corresponding to the voice data packet k, the packet loss scenario determining model outputs only one of the first packet loss scenario and the third packet loss scenario, and cannot output the second packet loss scenario. Similarly, for the voice data packet k+1, the adjacent voice data packet previous to the voice data packet k+1 is already lost, and the voice data packet k+1 cannot be compensated for by using the adjacent voice data packet previous to the voice data packet k+1. Therefore, the packet loss scenario determining model may also be preprocessed, so that when outputting a packet loss scenario corresponding to the voice data packet k+1, the packet loss scenario determining model outputs only one of the second packet loss scenario and the third packet loss scenario, and cannot output the first packet loss scenario. Specifically, after the packet loss scenario type corresponding to the voice data packet is determined by using the packet loss scenario determining model, performed steps are similar to the steps described in FIG. 3a, and details are not described herein again.

Figure 4:
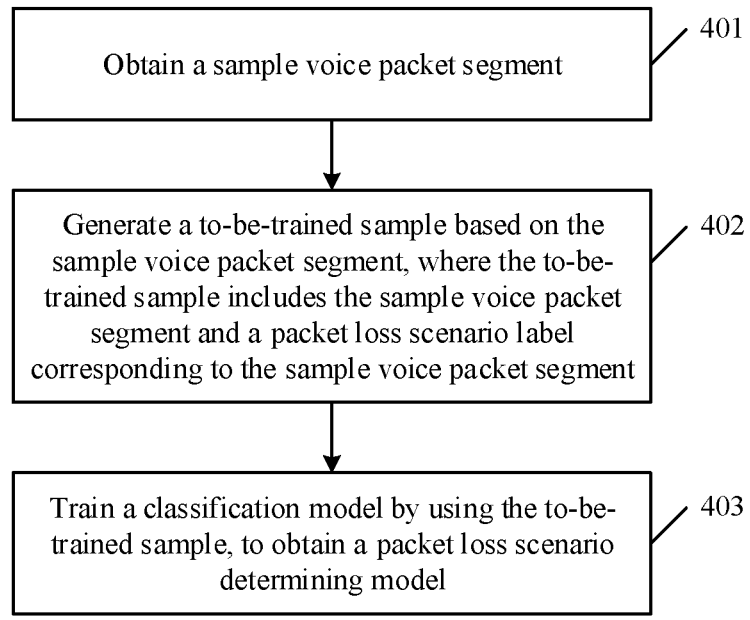
FIG. 4 is another schematic flowchart of a data processing method according to an embodiment of this application.

The foregoing describes in detail a procedure of the data processing method provided in embodiments of this application. For ease of understanding, the following describes in detail a training process of the packet loss scenario determining model used in the foregoing data processing method. For example, refer to FIG. 4. FIG. 4 is another schematic flowchart of a data processing method according to an embodiment of this application. The data processing method provided in this embodiment of this application may further include the following steps.

401: Obtain a sample voice packet segment.

In this embodiment of this application, before a packet loss scenario determining model is trained, a large quantity of sample voice packet segments are first obtained. For each of these sample voice packet segments, voice packets in the sample voice packet segment are not continuous and complete. Specifically, the sample voice packet segment may include a plurality of first voice packets, and at least one second voice packet in the sample voice packet segment has been removed, that is, the sample voice packet segment is a voice packet segment in which the second voice packet is lost. For example, the sample voice packet segment may be specifically obtained in the following manner: collecting, from existing voice packet data, a voice segment in which a voice packet is lost, to obtain the corresponding sample voice packet segment; or collecting continuous and complete voice segments from existing voice packet data, and discarding or removing one or more voice packets from these continuous and complete voice segments, to obtain the corresponding sample voice packet segment.

In some optional embodiments, a voice length corresponding to each sample voice packet segment may be specifically 6 to 8 seconds. Certainly, in some other embodiments, a sample voice packet segment having a longer or shorter voice length may be used. This is not limited herein. When the voice length corresponding to each sample voice packet segment is specifically 6 to 8 seconds, each sample voice packet segment may include 300 to 400 voice packets because a voice length corresponding to each voice packet is about 0.02 second. To ensure accuracy of the trained packet loss scenario model, about 100,000 sample voice packet segments may be specifically collected to train the packet loss scenario model in an actual training process. The sample voice packet segments for training may be specifically determined based on an actual application requirement. This is not specifically limited herein.

402: Generate a to-be-trained sample based on the sample voice packet segment, where the to-be-trained sample includes the sample voice packet segment and a packet loss scenario label corresponding to the sample voice packet segment.

In this embodiment, after the sample voice packet segment is obtained, the packet loss scenario label corresponding to the sample voice packet segment may be further determined, and the sample voice packet segment and the packet loss scenario label corresponding to the sample voice packet segment are used as the to-be-trained sample for training the packet loss scenario determining model.

In some optional embodiments, the generating a to-be-trained sample based on the sample voice packet segment may specifically include: replacing a lost second voice packet with a first voice packet, where the first voice packet is obtained by copying an adjacent first voice packet previous to the second voice packet in the sample voice packet segment, to obtain a complete and continuous sample voice packet segment; and obtaining, by performing an operation such as decoding processing, a first recovered voice corresponding to the sample voice packet segment. Similarly, the lost second voice packet is replaced with a first voice packet, where the first voice packet is obtained by copying an adjacent first voice packet following the second voice packet in the sample voice packet segment, to obtain another complete and continuous sample voice packet segment; and a second recovered voice corresponding to the another sample voice packet segment is obtained by performing an operation such as decoding processing. In addition, a third recovered voice corresponding to the sample voice packet segment may be obtained directly by using a PLC method. That is, the three different recovered voices may be obtained by using the three different compensation methods. Then, voice quality evaluation values corresponding to the first recovered voice, the second recovered voice, and the third recovered voice are separately obtained, that is, voice quality corresponding to the three segments of recovered voice is separately evaluated. The voice quality evaluation values corresponding to the first recovered voice, the second recovered voice, and the third recovered voice may be specifically obtained by calculating MOS scores. To be specific, a MOS score corresponding to the first recovered voice, a MOS score corresponding to the second recovered voice, and a MOS score corresponding to the third recovered voice are obtained, and the MOSs corresponding to the three recovered voices are used as the voice quality evaluation values corresponding to the three recovered voices. The MOS score is a criteria internationally used for evaluating compressed voice quality. During actual application, the MOS scores corresponding to the first recovered voice, the second recovered voice, and the third recovered voice may be specifically obtained by using a corresponding MOS score test device. After the voice quality evaluation values corresponding to the three recovered voices are obtained, a recovered voice with a largest voice quality evaluation value in the three recovered voices may be determined, and the packet loss scenario label corresponding to the sample voice packet segment is determined based on a compensation method used for the recovered voice. For example, when the voice quality evaluation value corresponding to the first recovered voice is largest, it is determined that the packet loss scenario label corresponding to the sample voice packet segment is a first packet loss scenario; when the voice quality evaluation value corresponding to the second recovered voice is largest, it is determined that the packet loss scenario label corresponding to the sample voice packet segment is a second packet loss scenario; or when the voice quality evaluation value corresponding to the third recovered voice is largest, it is determined that the packet loss scenario label corresponding to the sample voice packet segment is a third packet loss scenario. That is, the first packet loss scenario is a scenario in which an optimal voice recovery effect can be achieved after packet compensation is performed for a lost voice packet by using an adjacent voice packet previous to the lost voice packet. The second packet loss scenario is a scenario in which an optimal voice recovery effect can be achieved after packet compensation is performed for a lost voice packet by using an adjacent voice packet following the lost voice packet. The third packet loss scenario is a scenario in which an optimal voice recovery effect can be achieved after a lost voice packet is compensated for by using the PLC method.

403: Train a classification model by using the to-be-trained sample, to obtain the packet loss scenario determining model.

In this embodiment, a process of training the classification model by using the to-be-trained sample may be specifically as follows: training the classification model by using a voice coding parameter corresponding to the sample voice packet segment in the to-be-trained sample as an input of the classification model and using the packet loss scenario label corresponding to the sample voice packet segment as an output of the classification model. The voice coding parameter corresponding to the sample voice packet segment is specifically a parameter of an associated voice packet of the second voice packet in the sample voice packet segment.

In some optional embodiments, the associated voice packet of the second voice packet in the sample voice packet segment may be M adjacent data packets previous to the second voice packet, N adjacent data packets following the second voice packet, or M adjacent data packets previous to the second voice packet and N adjacent data packets following the first data packet. M is an integer greater than or equal to 1, N is an integer greater than or equal to 1, and M and N may be a same integer or different integers. This is not specifically limited herein.

For a voice packet, voice coding parameters included in a complete voice packet usually include adaptive codebook indexes (4 indexes included in each voice packet), fixed codebook index vectors (4 to 32 vectors included in each voice packet), adaptive codebook gain parameters (4 parameters included in each voice packet), fixed codebook gain parameters (4 parameters included in each voice packet), some specific parameters, and the like. Specifically, in this embodiment, some parameters in the associated voice packet may be selected to form a detection vector as an input of the classification model. These parameters in the associated voice packet that may be used to form the detection vector may specifically include parameters such as an adaptive codebook index, an adaptive codebook gain parameter, and a fixed codebook gain parameter. More other parameters may alternatively be selected as required in an actual application process. Details are not described herein again.

In some optional embodiments, the classification model may be specifically a model in deep learning such as a convolutional neural network (CNN) model or a long short-term memory network (LSTM) model, or may be a conventional machine learning model such as a random forest model or an Adaboost model. During actual application, a corresponding classification model may be selected based on a specific actual requirement. This is not specifically limited herein.

The foregoing describes in detail the data processing method provided in embodiments of this application. The following describes a data processing apparatus provided in embodiments of this application.

Figure 5:
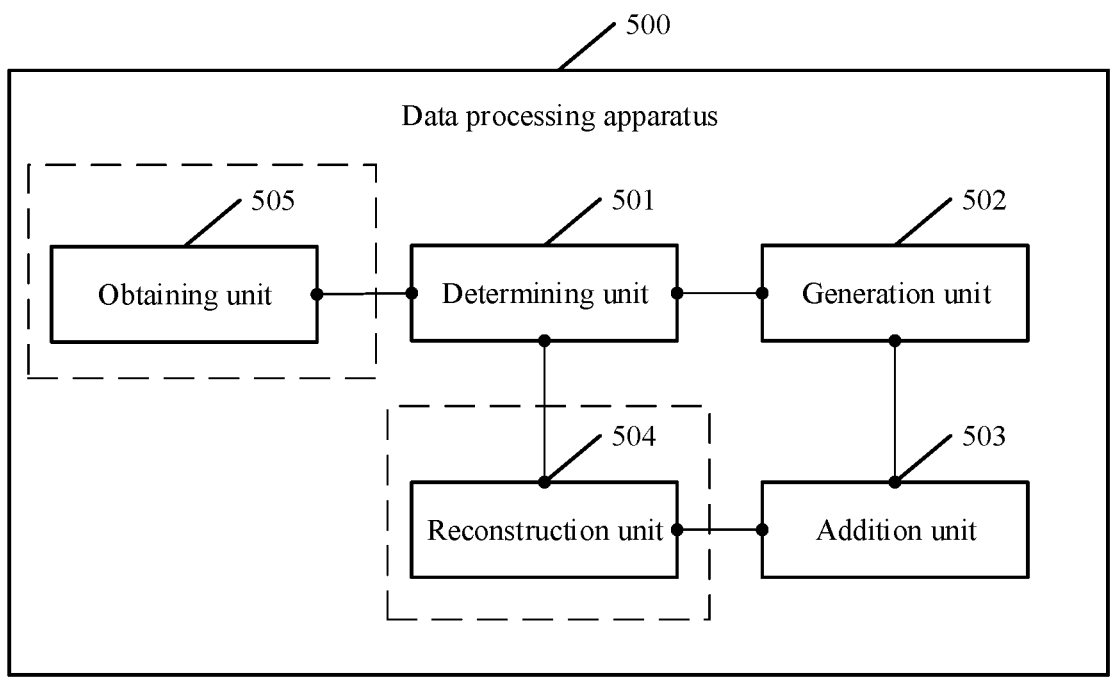
FIG. 5 is a schematic diagram of a structure of a data processing apparatus according to an embodiment of this application.

Refer to FIG. 5. FIG. 5 is a schematic diagram of a structure of a data processing apparatus according to an embodiment of this application. The data processing apparatus provided in this embodiment of this application may include:

a determining unit 501, configured to determine a packet loss scenario type corresponding to a first data packet when detecting that the first data packet is lost;

a generation unit 502, configured to generate a second data packet based on a data packet adjacent to the first data packet if the packet loss scenario type meets a data packet compensation condition; and an addition unit 503, configured to add the second data packet to a corresponding target location at which the first data packet is located before the first data packet is lost.

In some optional embodiments, the packet loss scenario type includes a first packet loss scenario, the data packet compensation condition includes a first compensation condition, and the first packet loss scenario meets the first compensation condition; and the generation unit 502 is specifically configured to generate the second data packet based on an adjacent data packet previous to the first data packet.

In some optional embodiments, the packet loss scenario type includes a second packet loss scenario, the data packet compensation condition includes a second compensation condition, and the second packet loss scenario meets the second compensation condition; and the generation unit 502 is specifically configured to generate the second data packet based on an adjacent data packet following the first data packet.

In some optional embodiments, the packet loss scenario type includes a third packet loss scenario, and the third packet loss scenario does not meet the data packet compensation condition; and the apparatus further includes a reconstruction unit 504, configured to: if the packet loss scenario type does not meet the data packet compensation condition, reconstruct a waveform of the first data packet by using a packet loss concealment PLC method.

In some optional embodiments, the determining unit 501 is specifically configured to: when detecting that the first data packet is lost, determine, based on an associated data packet corresponding to the first data packet, the packet loss scenario type corresponding to the first data packet, where the associated data packet is M adjacent data packets previous to the first data packet, the associated data packet is N adjacent data packets following the first data packet, or the associated data packet is M adjacent data packets previous to the first data packet and N adjacent data packets following the first data packet, where M is an integer greater than or equal to 1, and N is an integer greater than or equal to 1.

In some optional embodiments, the apparatus further includes an obtaining unit 505, configured to obtain a coding parameter of the associated data packet; and the determining unit 501 is specifically configured to: input the coding parameter of the associated data packet into a packet loss scenario determining model; and determine, based on an output result of the packet loss scenario determining model, the packet loss scenario type corresponding to the first data packet.

Figure 6:
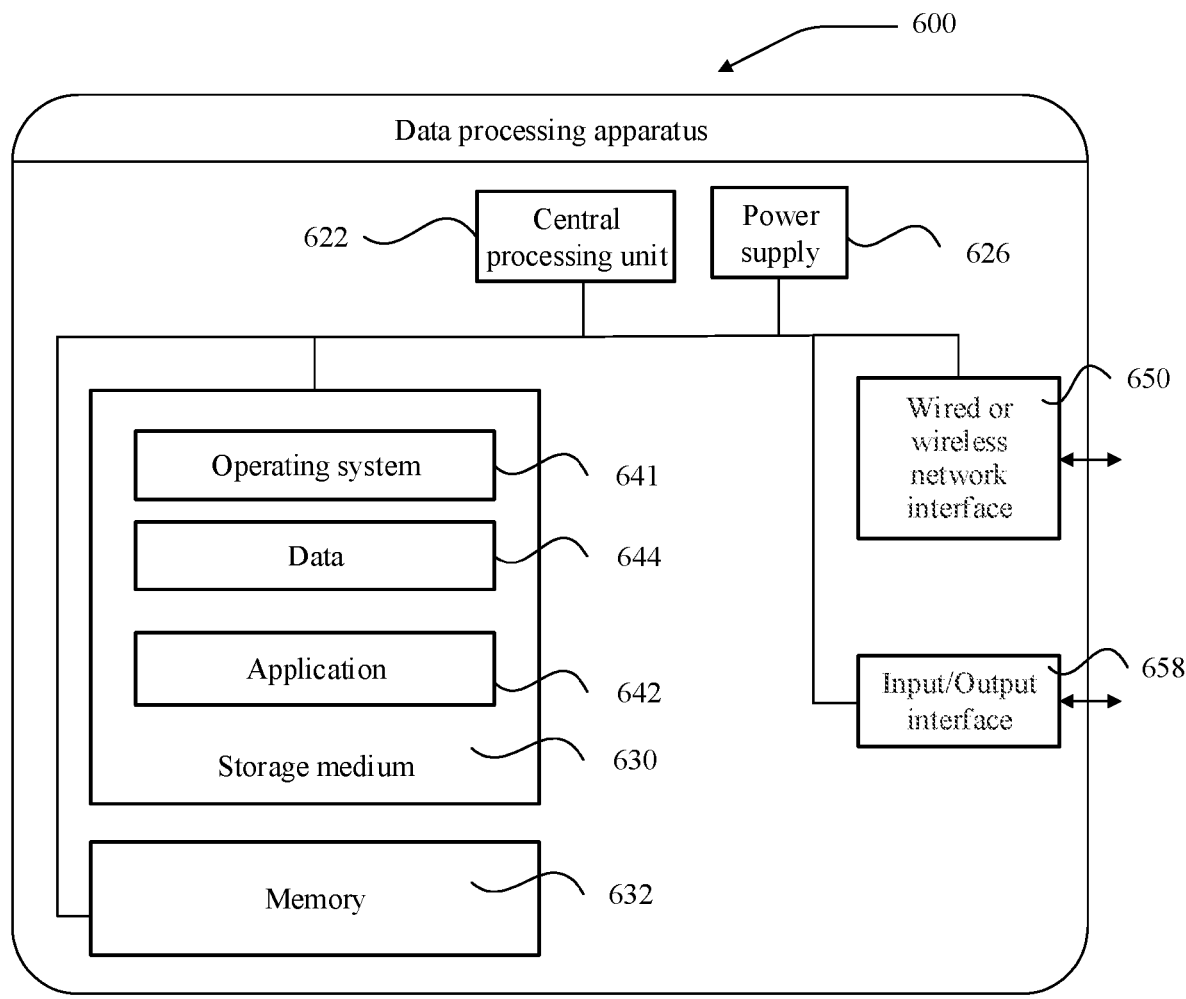
FIG. 6 is a schematic diagram of a structure of a data processing apparatus according to an embodiment of this application.

FIG. 6 is a schematic diagram of a structure of a data processing apparatus according to an embodiment of this application. The data processing apparatus 600 may vary greatly due to different configurations or performance, and may include one or more central processing units (CPUs) 622 (or processors of other types) and a storage medium 630. The storage medium 630 is configured to store one or more applications 642 or data 644. The storage medium 630 may be a transient storage or a persistent storage. A program stored in the storage medium 630 may include one or more modules (not shown in the figure), and each module may include a series of instruction operations for the data processing apparatus. Further, the central processing unit 622 may be configured to communicate with the storage medium 630, and perform, on the data processing apparatus 600, the series of instruction operations in the storage medium 630.

The central processing unit 622 may perform any one of the foregoing method embodiments based on the instruction operations.

The data processing apparatus 600 may further include one or more power supplies 626, one or more wired or wireless network interfaces 650, one or more input/output interfaces 658, and/or one or more operating systems 641 such as Windows Server™, Mac OS X™, Unix™, Linux™, and FreeBSD™.

The data processing apparatus provided in this application may include a base station, a core network device, a terminal, and the like.

Figure 7:
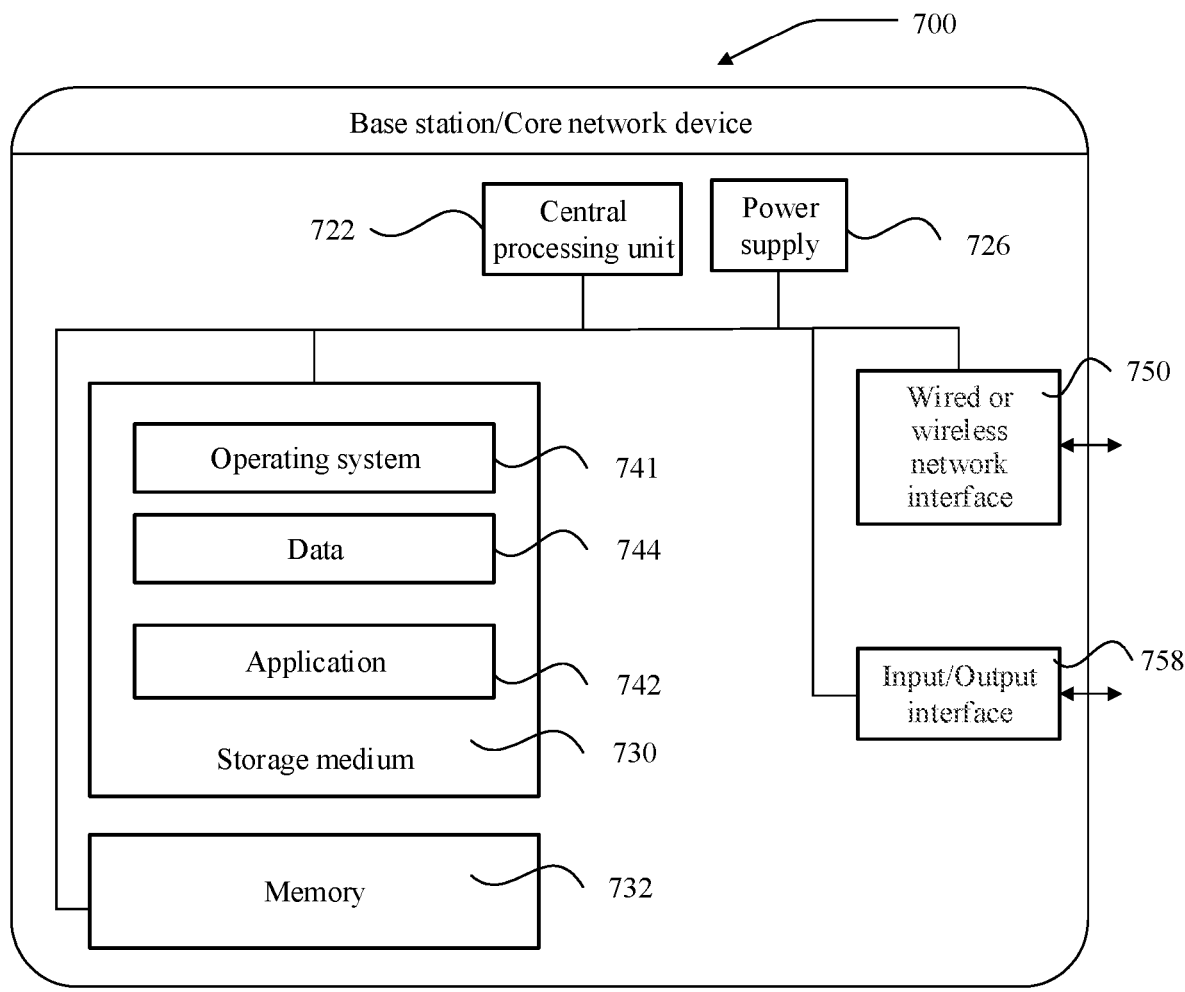
FIG. 7 is a schematic diagram of a structure of a base station or a core network device according to an embodiment of this application.

For example, when the data processing apparatus is the base station or the core network device, or the data processing apparatus is included in the base station or the core network device, a structure of the base station or the core network device may be shown in FIG. 7.

FIG. 7 is a schematic diagram of a structure of a base station or a core network device 700 according to an embodiment of this application. The base station or core network device 700 may vary greatly due to different configurations or performance, and may include one or more central processing units (CPUs) 722 (or processors of other types) and a storage medium 730. The storage medium 730 is configured to store one or more applications 742 or data 744. The storage medium 730 may be a transient storage or a persistent storage. A program stored in the storage medium 730 may include one or more modules (not shown in the figure), and each module may include a series of instruction operations for the base station. Further, the central processing unit 722 may be configured to communicate with the storage medium 730, and perform, on the base station or core network device 700, the series of instruction operations in the storage medium 730.

The central processing unit 722 may perform any one of the foregoing method embodiments based on the instruction operations.

The base station or core network device 700 may further include one or more power supplies 726, one or more wired or wireless network interfaces 750, one or more input/output interfaces 758, and/or one or more operating systems 741 such as Windows Server™, Mac OS X™, Unix™, Linux™, and FreeBSD™.

The data processing apparatus provided in embodiments of this application may be any type of terminal, or the data processing apparatus may be included in the terminal. For example, the terminal may be a mobile phone, a tablet computer, a notebook computer, a television set, an intelligent wearable device, or another electronic device having a display. A specific form of the terminal is not limited in the foregoing embodiments. In addition, a system that may be installed on the terminal may include iOS®, Android®, Microsoft®, Linux®, or another operating system. This is not limited in embodiments of this application.

The terminal is applicable to various communication systems. Specifically, the communication system is, for example, a CDMA system, a TDMA system, an FDMA system, an OFDMA system, an SC-FDMA system, or another system. Terms "system" and "network" may be interchanged with each other. The CDMA system may implement radio technologies such as UTRA and CDMA2000. UTRA may include a WCDMA technology and another variation technology of CDMA. CDMA2000 may cover the interim standard (interim standard, IS) 2000 (IS-2000), the IS-95 standard, and the IS-856 standard. The TDMA system may implement a wireless technology such as global system for mobile communications (GSM). The OFDMA system may implement a wireless technology such as evolved universal terrestrial radio access (evolved UTRA, E-UTRA), ultra mobile broadband (UMB), IEEE 802.11 (Wi-Fi), IEEE 802.7 (WiMAX), IEEE 802.20, or Flash OFDMA. UTRA and E-UTRA belong to UMTS, and are evolved versions of UMTS. A new version of UMTS that uses E-UTRA is used in long term evolution (LTE) and various versions evolved based on LTE in 3GPP. In addition, the communication system is further applicable to a future-oriented communication technology, and may be applied to the technical solutions provided in embodiments of this application.

Figure 8:
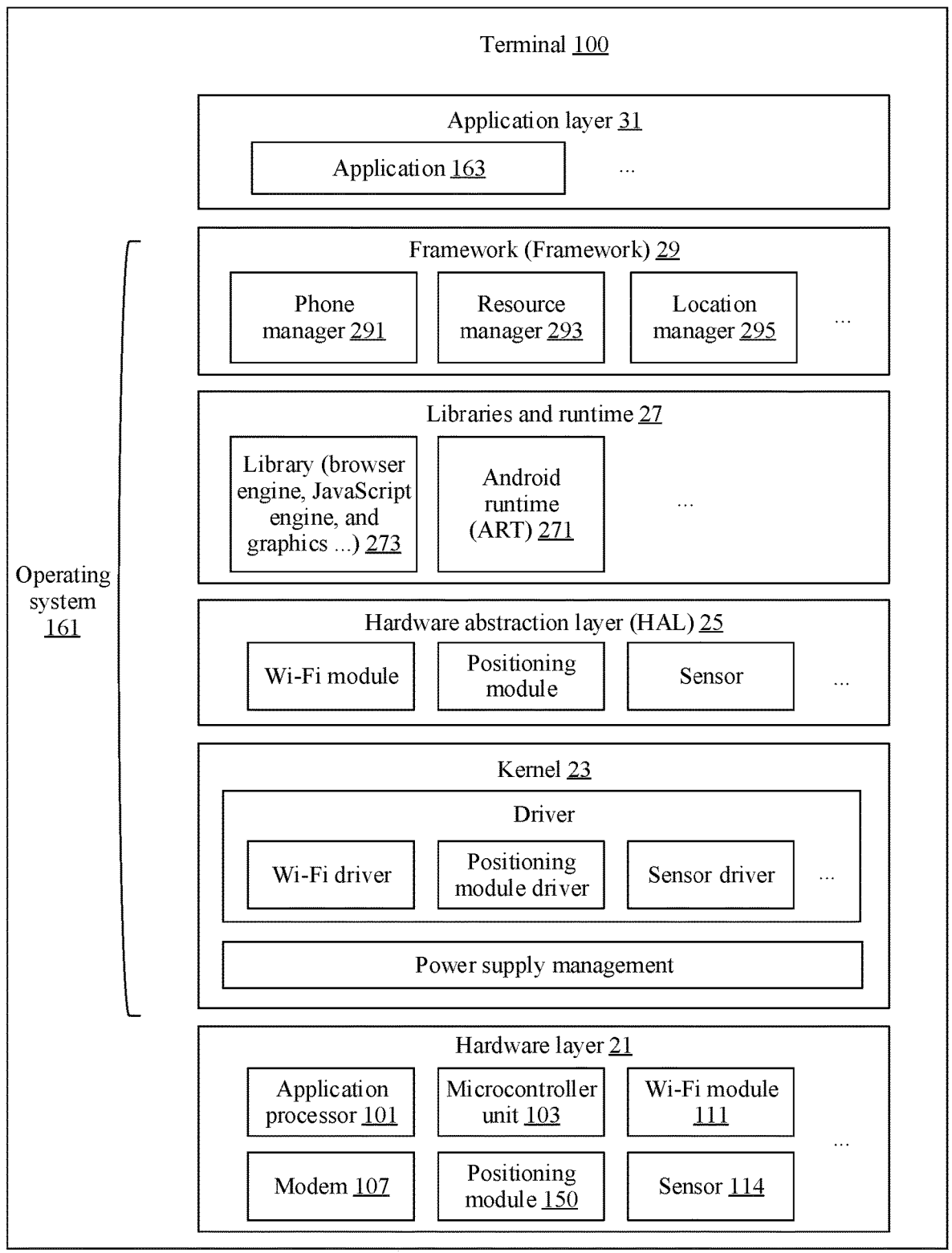
FIG. 8 is a schematic diagram of a structure of a terminal according to an embodiment of this application.

For example, a terminal 100 installed with the Android® operating system is used as an example. As shown in FIG. 8, the terminal 100 may be logically divided into a hardware layer 21, an operating system 161, and an application layer 31. The hardware layer 21 includes hardware resources such as an application processor 101, a microcontroller unit 103, a modem 107, a Wi-Fi module 111, a sensor 114, a positioning module 150, and a memory. The application layer 31 includes one or more applications, for example, an application 163. The application 163 may be an application of any type, for example, a social application, an e-commerce application, or a browser. The operating system 161 is used as software middleware between the hardware layer 21 and the application layer 31, and is a computer program for managing and controlling hardware and software resources.

In an embodiment, the operating system 161 includes a kernel 23, a hardware abstraction layer (HAL) 25, libraries and runtime 27, and a framework 29. The kernel 23 is configured to provide an underlying system component and a service, for example, power management, memory management, thread management, or a hardware driver. The hardware driver includes a Wi-Fi driver, a sensor driver, a positioning module driver, or the like. The hardware abstraction layer 25 encapsulates a kernel driver, provides an interface for the framework 29, and shields implementation details of a lower layer. The hardware abstraction layer 25 runs in user space, and the kernel driver runs in kernel space.

The libraries and runtime 27 is also referred to as a runtime library, and provides a required library file and execution environment when an executable program is run. The libraries and runtime 27 includes an Android runtime (ART) 271, a library 273, and the like. The ART 271 is a virtual machine or virtual machine instance that can convert bytecode of the application into machine code. The library 273 is a program library that provides support for the executable program during running, and includes a browser engine (for example, webkit), a script execution engine (for example, a JavaScript engine), a graphics processing engine, or the like.

The framework 29 is configured to provide various basic common components and services, such as window management and location management, for the application in the application layer 31. The framework 29 may include a phone manager 291, a resource manager 293, a location manager 295, and the like.

All functions of components in the operating system 161 described above may be implemented by the application processor 101 by executing the program stored in the memory.

Persons skilled in the art may understand that the terminal 100 may include fewer or more components than those shown in FIG. 8. The terminal shown in FIG. 8 includes only components more related to a plurality of implementations disclosed in embodiments of this application.

The terminal usually supports installation of a plurality of applications (APPs), such as a word processing application, a phone application, an email application, an instant messaging application, a photo management application, a network browsing application, a digital music player application, and/or a digital video player application.

This application provides a chip system. The chip system includes a processor, configured to support a data processing apparatus in implementing functions in the foregoing aspects, for example, sending or processing data and/or information in the foregoing methods. In a possible design, the chip system further includes a memory, and the memory is configured to store necessary program instructions and necessary data. The chip system may include a chip, or may include the chip and another discrete device.

In another possible design, when the data processing apparatus is a chip in a terminal, a base station, or the like, the chip includes a processing unit and a communication unit. The processing unit may be, for example, a processor. The communication unit may be, for example, an input/output interface, a pin, or a circuit. The processing unit may execute computer executable instructions stored in a storage unit, so that the chip in the terminal, the base station, or the like performs the steps of the method performed by the network in any one of the foregoing method embodiments. Optionally, the storage unit is a storage unit in the chip, for example, a register or a cache, or the storage unit may be a storage unit in the terminal, the base station, or the like but outside the chip, for example, a read-only memory ROM) or another type of static storage device capable of storing static information and instructions, or a random access memory (RAM).

An embodiment of this application further provides a chip, including a processing module and a communication interface. The processing module can perform a method procedure related to the data processing apparatus in any one of the foregoing method embodiments. Further, the chip may further include a storage module (for example, a memory). The storage module is configured to store instructions. The processing module is configured to execute the instructions stored in the storage module, and the execution of the instructions stored in the storage module enables the processing module to perform a method procedure related to the data processing apparatus in any one of the foregoing method embodiments.

An embodiment of this application further provides a communication system. The communication system may include a terminal and a base station. The terminal may be the terminal shown in FIG. 8, and the terminal may be configured to perform any step in any one of the foregoing method embodiments. The base station may be the base station or the core network device shown in FIG. 7, and the base station or the core network device may be configured to perform any step in any one of the foregoing method embodiments.

An embodiment of this application further provides a computer-readable storage medium, and the computer-readable storage medium stores a computer program. When the computer program is executed by a computer, a method procedure related to the data processing apparatus in any one of the foregoing method embodiments is implemented. Correspondingly, the computer may be the data processing apparatus.

An embodiment of this application further provides a computer program or a computer program product including the computer program. When the computer program is executed on a computer, the computer is enabled to implement a method procedure related to the data processing apparatus in any one of the foregoing method embodiments. Correspondingly, the computer may be the data processing apparatus.

All or some of the foregoing embodiments may be implemented by using software, hardware, firmware, or any combination thereof. When being implemented by using the software, all or some of embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It should be understood that, the processor mentioned in this application may be a central processing unit (CPU), or the processor may be another general-purpose processor, a digital signal processor (Digital Signal Processor, DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that there may be one or more processors in this application. This may be specifically adjusted based on an actual application scenario, is merely an example for description herein, and is not limited herein. There may be one or more memories in embodiments of this application. This may be specifically adjusted based on an actual application scenario, is merely an example for description herein, and is not limited.

It should be further noted that when the data processing apparatus includes a processor (or a processing module) and a memory, the processor in this application may be integrated with the memory, or may be connected to the memory through an interface. This may be specifically adjusted based on an actual application scenario, and is not limited.

Persons skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, another network device, or the like) to perform all or some of the steps of the methods in the embodiments shown in FIG. 2 and FIG. 4 of this application. The foregoing storage medium includes any medium that can store program code, such as a USB flash drive, a removable hard disk, a ROM, a RAM, a magnetic disk, or an optical disc.

It should be understood that the storage medium or the memory in this application may be a volatile memory or a non-volatile memory, or may include both a volatile memory and a non-volatile memory. The non-volatile memory may be a ROM, a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a RAM, and is used as an external cache. Through example but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that the memory described in this specification is intended to include, but is not limited to, these memories and any other appropriate types of memories.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data processing method, comprising:
    determining a packet loss scenario type corresponding to a first data packet when detecting that the first data packet is lost;
    generating a second data packet based on a data packet adjacent to the first data packet when it is determined that the packet loss scenario type meets a data packet compensation condition; and
    adding the second data packet to a corresponding target location at which the first data packet is located before the first data packet is lost.

2. The data processing method according to claim 1, wherein the packet loss scenario type comprises a first packet loss scenario, the data packet compensation condition comprises a first compensation condition, and the first packet loss scenario meets the first compensation condition; and
    the generating a second data packet based on a data packet adjacent to the first data packet comprises:
    generating the second data packet based on an adjacent data packet previous to the first data packet.

3. The data processing method according to claim 1, wherein the packet loss scenario type comprises a second packet loss scenario, the data packet compensation condition comprises a second compensation condition, and the second packet loss scenario meets the second compensation condition; and
    the generating a second data packet based on a data packet adjacent to the first data packet comprises:
    generating the second data packet based on an adjacent data packet following the first data packet.

4. The data processing method according to claim 1, wherein the packet loss scenario type comprises a third packet loss scenario, and the third packet loss scenario does not meet the data packet compensation condition; and
    the method further comprises:
    when it is determined that the packet loss scenario type does not meet the data packet compensation condition, reconstructing a waveform of the first data packet by using a packet loss concealment (PLC) method.

5. The data processing method according to claim 1, wherein the determining a packet loss scenario type corresponding to a first data packet when detecting that the first data packet is lost comprises:
    when detecting that the first data packet is lost, determining, based on an associated data packet corresponding to the first data packet, the packet loss scenario type corresponding to the first data packet, wherein the associated data packet is M adjacent data packets previous to the first data packet, the associated data packet is N adjacent data packets following the first data packet, or the associated data packet is M adjacent data packets previous to the first data packet and N adjacent data packets following the first data packet, wherein M is an integer greater than or equal to 1, and N is an integer greater than or equal to 1.

6. The data processing method according to claim 5, wherein the method further comprises:
    obtaining a coding parameter of the associated data packet; and
    determining the packet loss scenario type based on the associated data packet comprises:

inputting the coding parameter of the associated data packet into a packet loss scenario determining model; and determining, based on an output result of the packet loss scenario determining model, the packet loss scenario type corresponding to the first data packet.

7. A data processing apparatus, comprising:
a determining unit, configured to determine a packet loss scenario type corresponding to a first data packet when detecting that the first data packet is lost;
a generation unit, configured to generate a second data packet based on a data packet adjacent to the first data packet when it is determined that the packet loss scenario type meets a data packet compensation condition; and
an addition unit, configured to add the second data packet to a corresponding target location at which the first data packet is located before the first data packet is lost.

8. The data processing apparatus according to claim 7, wherein the packet loss scenario type comprises a first packet loss scenario, the data packet compensation condition comprises a first compensation condition, and the first packet loss scenario meets the first compensation condition; and
the generation unit is further configured to generate the second data packet based on an adjacent data packet previous to the first data packet.

9. The data processing apparatus according to claim 7, wherein the packet loss scenario type comprises a second packet loss scenario, the data packet compensation condition comprises a second compensation condition, and the second packet loss scenario meets the second compensation condition; and
the generation unit is further configured to generate the second data packet based on an adjacent data packet following the first data packet.

10. The data processing apparatus according to claim 7, wherein the packet loss scenario type comprises a third packet loss scenario, and the third packet loss scenario does not meet the data packet compensation condition; and
the apparatus further comprises a reconstruction unit, configured to: when it is determined that the packet loss scenario type does not meet the data packet compensation condition, reconstruct a waveform of the first data packet by using a packet loss concealment (PLC) method.

11. The data processing apparatus according to claim 7, wherein the determining unit is further configured to: when detecting that the first data packet is lost, determine, based on an associated data packet corresponding to the first data packet, the packet loss scenario type corresponding to the first data packet, wherein the associated data packet is M adjacent data packets previous to the first data packet, the associated data packet is N adjacent data packets following the first data packet, or the associated data packet is M adjacent data packets previous to the first data packet and N adjacent data packets following the first data packet, wherein M is an integer greater than or equal to 1, and N is an integer greater than or equal to 1.

12. The data processing apparatus according to claim 11, wherein the apparatus further comprises:
an obtaining unit, configured to obtain a coding parameter of the associated data packet; and
the determining unit is further configured to: input the coding parameter of the associated data packet into a packet loss scenario determining model; and determine, based on an output result of the packet loss scenario determining model, the packet loss scenario type corresponding to the first data packet.

13. A non-transitory computer readable medium, wherein the non-transitory computer readable medium stores instructions that are executable by a computer, and the instructions comprise instructions for:
determining a packet loss scenario type corresponding to a first data packet when detecting that the first data packet is lost;
generating a second data packet based on a data packet adjacent to the first data packet when it is determined that the packet loss scenario type meets a data packet compensation condition; and
adding the second data packet to a corresponding target location at which the first data packet is located before the first data packet is lost.

14. The non-transitory computer readable medium according to claim 13, wherein the packet loss scenario type comprises a first packet loss scenario, the data packet compensation condition comprises a first compensation condition, and the first packet loss scenario meets the first compensation condition; and
the generating a second data packet based on a data packet adjacent to the first data packet comprises:
generating the second data packet based on an adjacent data packet previous to the first data packet.

15. The non-transitory computer readable medium according to claim 13, wherein the packet loss scenario type comprises a second packet loss scenario, the data packet compensation condition comprises a second compensation condition, and the second packet loss scenario meets the second compensation condition; and
the generating a second data packet based on a data packet adjacent to the first data packet comprises:
generating the second data packet based on an adjacent data packet following the first data packet.

* * * * *